(12) United States Patent
Fedronic et al.

(10) Patent No.: US 7,574,734 B2
(45) Date of Patent: Aug. 11, 2009

(54) SYSTEM AND METHOD FOR SEQUENTIALLY PROCESSING A BIOMETRIC SAMPLE

(76) Inventors: Dominique Louis Joseph Fedronic, 2745 Yosemite Dr., Belmont, CA (US) 94002; Eric F. Le Saint, 1161 Chopin Ter. #300, Fremont, CA (US) 94538

( * ) Notice: Subject to any disclaimer, the term of this patent is extended or adjusted under 35 U.S.C. 154(b) by 627 days.

(21) Appl. No.: 10/218,640

(22) Filed: Aug. 15, 2002

(65) Prior Publication Data

US 2004/0034783 A1    Feb. 19, 2004

(51) Int. Cl.
*H04L 9/00* (2006.01)
*G06F 7/04* (2006.01)
*G06K 9/00* (2006.01)

(52) U.S. Cl. .................. 726/9; 726/5; 726/18; 713/159; 713/170; 713/172; 713/185; 713/186; 382/115; 382/116; 382/124

(58) Field of Classification Search ................. 713/150, 713/168, 182, 185, 186, 159, 170, 172; 726/2, 726/5, 9, 18; 380/255; 382/115–127

See application file for complete search history.

(56) References Cited

U.S. PATENT DOCUMENTS

| | | | |
|---|---|---|---|
| 6,256,737 B1 | 7/2001 | Bianco et al. | |
| 6,311,272 B1 | 10/2001 | Gressel | |
| 6,332,193 B1 * | 12/2001 | Glass et al. | 713/170 |
| 2001/0026632 A1 | 10/2001 | Tamai | |
| 2001/0046292 A1 * | 11/2001 | Gligor et al. | 380/37 |
| 2002/0030359 A1 | 3/2002 | Bergenek et al. | |

(Continued)

FOREIGN PATENT DOCUMENTS

EP    0956818    11/1999

(Continued)

OTHER PUBLICATIONS

European Search Report dated Nov. 18, 2004.

(Continued)

*Primary Examiner*—Benjamin E Lanier
*Assistant Examiner*—Abdulhakim Nobahar
(74) *Attorney, Agent, or Firm*—Perkins Coie LLP

(57) ABSTRACT

This invention provides for progressive processing of biometric samples to facilitate verification of an authorized user. The initial processing is performed by a security token. Due to storage space and processing power limitations, excessive false rejections may occur. To overcome this shortfall, the biometric sample is routed to a stateless server, which has significantly greater processing power and data enhancement capabilities. The stateless server receives, processes and returns the biometric sample to the security token for another attempt at verification using the enhanced biometric sample. In a second embodiment of the invention, a second failure of the security token to verify the enhanced biometric sample sends either the enhanced or raw biometric sample to a stateful server. The stateful server again processes the biometric sample and performs a one to many search of a biometric database. The biometric database contains the master set of enrolled biometric templates associated with all authorized users. Signals generated by the stateful server are used by the security token to allow or deny access to a resource or function. In both embodiments of the invention, the heuristics remain with the security token.

69 Claims, 28 Drawing Sheets

U.S. PATENT DOCUMENTS

2002/0031230 A1* 3/2002 Sweet et al. .............. 380/278
2004/0005087 A1* 1/2004 Hillhouse .................. 382/125
2005/0138392 A1* 6/2005 Johnson et al. ............ 713/186

FOREIGN PATENT DOCUMENTS

EP        1085454        3/2001

OTHER PUBLICATIONS

Partial European Search Report dated Jul. 26, 2004.

F. Podio, et al., "Common Biometric Exchange File Format (CEBFF)", National Institute of Standards of Technology (NIST), pp. 1-32, Jan. 3, 2001.

BioAPI Specification, Version 1.1, pp. 1-119, Mar. 16, 2001.

Harvey, Mike. "Why veins could replace fingerprints and retinas as most secure form of ID." *Times Online* Nov. 11, 2008, 2 pages <http://technology.timesonline.co.uk/tol/news/tech_and _web/articles5129384.ece>.

* cited by examiner

SYSTEM AND METHOD FOR SEQUENTIALLY PROCESSING A BIOMETRIC SAMPLE

FIELD OF INVENTION

The present invention relates generally to a data processing system and method and more specifically to a data processing system and method for sequentially processing a biometric sample to improve the probability of a successful biometric verification.

BACKGROUND

In the relevant art, biometry is accomplished using conventional client/server models in which a biometric sample is obtained using a biometric scanner attached to a local client, initially extracted and pre-processed by the local client and the processed result sent to a server for additional processing and verification. An example of a biometric authentication system is disclosed in U.S. Pat. No. 6,256,737, to Bianco, et al. The initial sample extraction performed by the client typically converts a grayscale or color image into a smaller digital output file. The digital output file is then processed using a biometric template by obtaining data points from one or more predefined regions of the digital output file which is then compared against a stored reference.

The biometric template is divided into a public portion and a private portion. The public portion of the template is generally used to determine the quality of the biometric sample, correct variations in sampling geometry and to extract data points for comparison against the data points contained in the private portion of the template. The reference data points included in the private portion of the biometric template are obtained during an initial enrollment session using equivalent biometric templates and processing algorithms.

The private template portion requires security measures equivalent to or greater than those used to protect a personal identification number (PIN.) As such, a user's biometric template is generally stored in a biometric database associated with a remote authentication server rather than storing a user's biometric template locally. Use of the client for storage of biometric templates or performing verifications is strongly disfavored since a surreptitiously installed rogue application could be used to track data points that result in successful verifications eventually leading to determination of the data points comprising the private template.

In the relevant art, to access a system or resource, an enrolled user provides a biometric sample which is sent to the remote authentication server, processed and used to query the biometric database using a one-to-many relationship. Biometric identifications systems deploying architectures of this type are processing intensive and could become a bottleneck to authentication as the sophisticated processing requirements for biometric authentication may result in access delays when the authentication server receives a large number of access requests in a short period of time, such as would occur at the start of a work day or shift change.

To overcome some of these limitations, a recent innovation stores the biometric template within the secure domain of a security token such as a smart card. An example of which is disclosed in U.S. Pat. No. 6,311,272 to Gressel. The security token securely maintains the biometric template and attempts an initial one-to-one match using the received digitized sample data from the client. This innovation provides more of a distributed processing approach, which alleviates to some extent the processing requirements of a server-based biometric authentication system.

However, due to limitations in available storage space and processing power, the use of a security token alone could result in higher false rejection rates than would be obtained using the greater processing capabilities available on a client/server based biometric authentication system. In addition, the limited processing capabilities makes the security token alone more susceptible to distortions introduced into the biometric sample from a new scar, cut, burn, dirt, skewed sample image, degraded scanner membrane, etc. Furthermore, many security tokens include a maximum number of attempts before a lockout occurs as an additional security feature. Repeated verification failures may be counted toward the lockout, increasing administrative overhead and negatively impacting work productivity.

Thus, it would be highly desirable to have a biometric verification system, which incorporates the robust security features inherent in security tokens and the additional processing capabilities available using a server but is not reliant on a vulnerable client to perform sensitive verification transactions, retains the heuristics of the security token and avoids to the extent possible repeated biometric sampling attempts by the user.

OBJECTIVES

It is a first object of the invention to provide a heuristic approach in verifying a biometric sample against a pre-established reference.

It is a second object of the invention to provide additional processing of biometric samples beyond that achievable by a security token using a stateless server.

It is a third object of the invention to provide further processing of biometric sample data beyond that achievable by a stateless server using a stateful server performing a one-to-one or a one-to-many database search of pre-established biometric references.

SUMMARY

This invention provides a system and method for sequentially processing a biometric sample received from a biometric scanner, initially processing the sample using a security token and a first attempt at verifying the processed sample against a stored biometric template.

In the event of a degraded biometric sample or other factor which causes the initial verification attempt by the security token to fail, the biometric sample and a first set of biometric processing parameters including a unique identifier associated with the security token, a biometric algorithm descriptor and the biometric template are securely sent to a more powerful stateless server for additional processing of the biometric sample and a second verification attempt.

The format of the data sent from the security token to the stateless server is intended to be in a format compliant with NISTIR 6529, "Common Biometric Exchange File Format (CEBFF), Jan. 3, 2001, National Institute of Standards and Technology (NIST,) which is incorporated by reference herein.

The biometric algorithm descriptor is used to retrieve a server biometric processing algorithm equivalent to the biometric processing algorithm employed by the security token. If the stateless server is successful, the requesting security token is unlocked using a pre-established cryptography mechanism. If the stateless server is unsuccessful, a 'reject' signal is returned to the security token and access to security token resources is denied.

In the preferred embodiment of the invention, the pre-established cryptography mechanism utilizes symmetric cryptography methods to regenerate a security token key by diversifying a pre-established master key maintained on the stateless server with the unique token identifier. The use of symmetric methods improves transaction speed and minimizes key storage space requirements within the security token. However, one skilled in the art will appreciate that asymmetric cryptography mechanisms will work as well.

In a second embodiment of the invention, a second verification failure by the stateless server causes the biometric sample and a second set of biometric processing parameters including the biometric algorithm descriptor, unique security token identifier and the client's telecommunications address, to be sent to a stateful server for further processing.

The stateful server first performs a one-to-one query of the biometric database using the security token's unique identifier to retrieve a higher resolution biometric template stored in the biometric database during the user's enrollment. The stateful server first attempts to verify the user using the server equivalent of the biometric processing algorithm employed by the security token. If the stateful server is successful, the security token is unlocked using the same pre-established cryptography mechanism described above.

If the first attempt by the stateful server is unsuccessful, a second attempt is performed using a different biometric processing algorithm. If the second verification attempt by the stateful server is successful, the security token is unlocked as previously described. Optionally, a replacement biometric processing applet which utilizes the different biometric processing algorithm may be downloaded and operatively installed inside the security token along with a replacement biometric template appropriate for use with the new biometric processing applet.

If the second attempt by the stateful server is unsuccessful, the 'reject' signal is returned to the security token and access to security token resources is denied. A one-to-many query of enrolled biometric templates is then performed to attempt to identify the individual requesting access. If the stateful server is still unsuccessful, an optional query of an external biometric database is then performed, for example, sending a query to a national automated fingerprint identification system (AFIS) or its equivalent for non-fingerprint biometric data. In either the first or second embodiments of the invention, transaction audit trails may be generated for all off token transactions.

DETAILED DESCRIPTION

This invention provides an improvement over the relevant art by sequentially processing a biometric sample after a failed verification attempt using a security token. An initial verification failure sends the biometric sample, a cryptogram containing a biometric template and a first set of biometric processing parameters to a stateless server for additional digital processing beyond that reasonably achievable using the security token. The biometric processing parameters include a unique token identifier and a biometric algorithm descriptor. In the preferred embodiment of the invention, the biometric template is encrypted with a symmetric token key or a derivation thereof, previously diversified from a master key operatively stored on the stateless server using the unique token identifier.

The stateless server regenerates a duplicate token key using a stored master key and the token unique identifier. The duplicate token key or the derivative thereof is then used to decrypt the received biometric template. The master key and duplicate token key may be maintained in the secure domain of a hardware security module to prevent unauthorized disclosure.

The biometric algorithm descriptor is used to retrieve a server biometric processing algorithm equivalent to the biometric processing algorithm employed by the security token. The extracted biometric sample is then processed by the second biometric processing algorithm and a second verification attempted. If the second verification attempt is successful, the regenerated token key is used to unlock the security token and allow access to security token resources.

In the first embodiment of the invention, a second verification failure by the stateless server may require the user to provide another biometric sample. In the second embodiment of the invention, the biometric sample and a second set of biometric processing parameters including the unique token identifier, biometric algorithm descriptor and telecommunications address of the client are sent to a stateful server where additional processing of the extracted sample is performed. A third verification attempt is performed by comparing the extracted biometric sample against a higher resolution biometric template stored in a biometric database including a plurality of biometric templates obtained from at least all authorized users.

Figure 1:
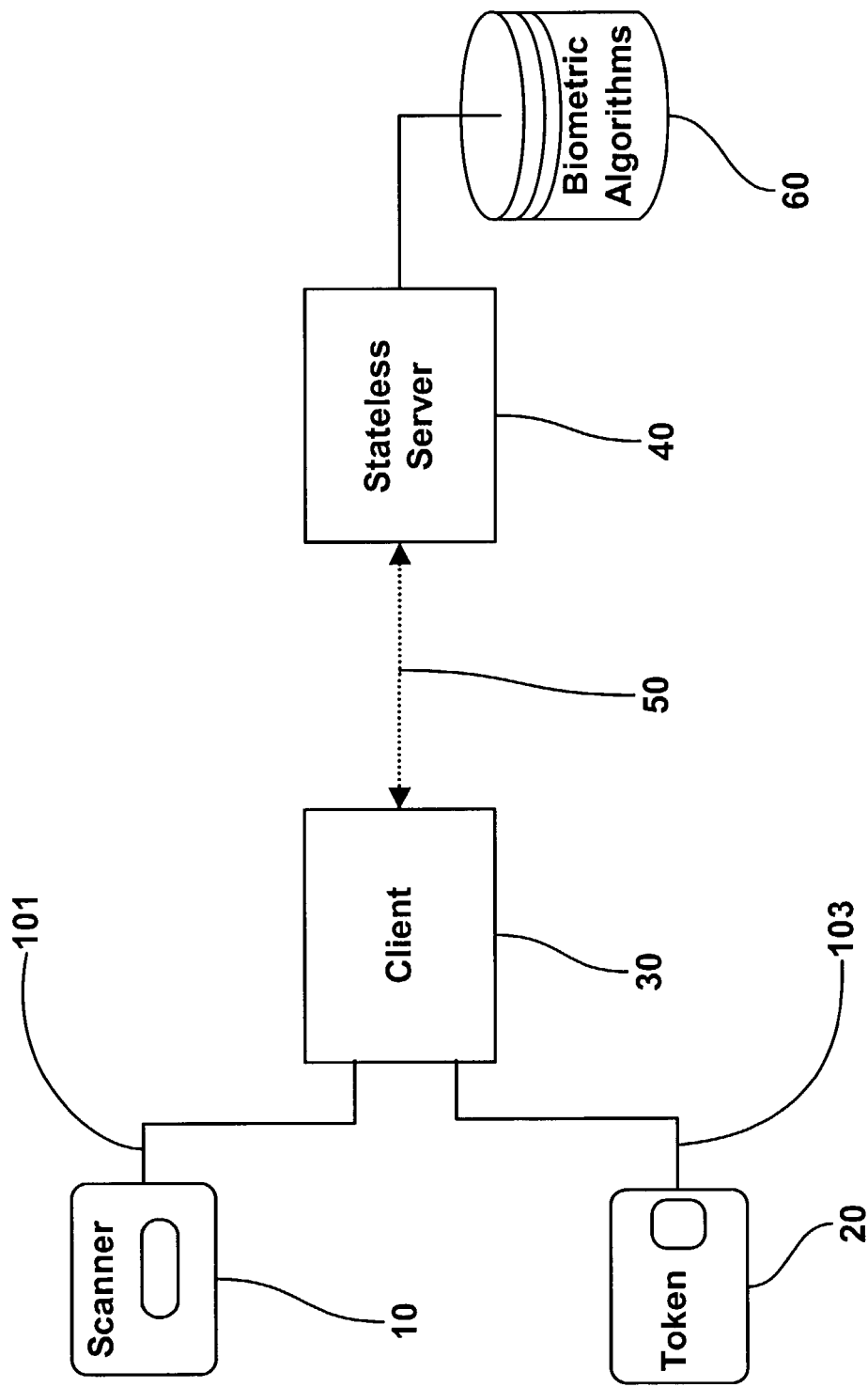
FIG. 1—is a generalized block diagram illustrating a first embodiment of the invention.

Referring to FIG. 1, a general block diagram depicts the major processing components included in the first embodiment of the invention. A biometric scanner 10 is shown connected 101 to a local client 30. The biometric scanner may obtain samples of facial features, voice pattern, fingerprints, iris, retina, hand geometry, signature dynamics, keystroke dynamics, lip movement, thermal face image, thermal hand image, gait, body odor, DNA, ear shape, finger geometry, palm geometry or vein patterns.

The client 30 includes the necessary hardware and software to receive images from the biometric scanner 10 and convert the images to a digital sample in a format compliant with NISTIR 6529, "Common Biometric Exchange File Format (CEBFF), Jan. 3, 2001, National Institute of Standards and Technology (NIST). The client further includes the necessary hardware and software to exchange 103 processed biometric samples with a security token 20 and a stateless server 40 connected to the client through a telecommunications link 50.

The client 30 may be a full computer system or a dedicated biometric scanner incorporating a security token reader and communications interface. For example, an access entry reader used to open a security door. If the client is a full computer system, addition sample pre-processing may be accomplished by digitally enhancing the sample before the security token attempts to perform a verification of the incoming sample.

A security token 20 includes the necessary modules to perform approximate one-to-one comparisons between digital biometric samples extracted and optionally preprocessed by the client 30 and a pre-established biometric template stored within its secure domain. The approximate one-to-one match includes sufficient tolerance to account for variations in sample data. The security token also includes the necessary logic circuitry to detect a failed initial verification attempt and the ability to send a biometric sample and the first set of biometric processing parameters to the stateless server 40 for further processing.

The stateless server 40 includes the necessary hardware and software to exchange biometry information with the security token 20 using the client 30 as a telecommunications interface and digital processing means to digitally enhance the received biometric samples in order to improve the overall sample quality and hence improving the probability of match against the pre-established biometric template. The telecommunications link 50 may include direct electrical connections, wireless connections, optical connections and network arrangements. A secure messaging protocol such as secure socket layer (SSL) encryption, transport layer security (TLS) or IPsec is preferably employed during data exchanges between the security token 20 and stateless server 40.

The stateless server includes the ability to retrieve from storage 60 an appropriate biometric processing algorithm based on one of the parameters received from the security token. This allows the stateless server 40 to process and attempt to verify a wide variety of biometric sample types. For example, an iris scan would require a different biometric processing algorithm than would be used to process a fingerprint scan.

Figure 1A:
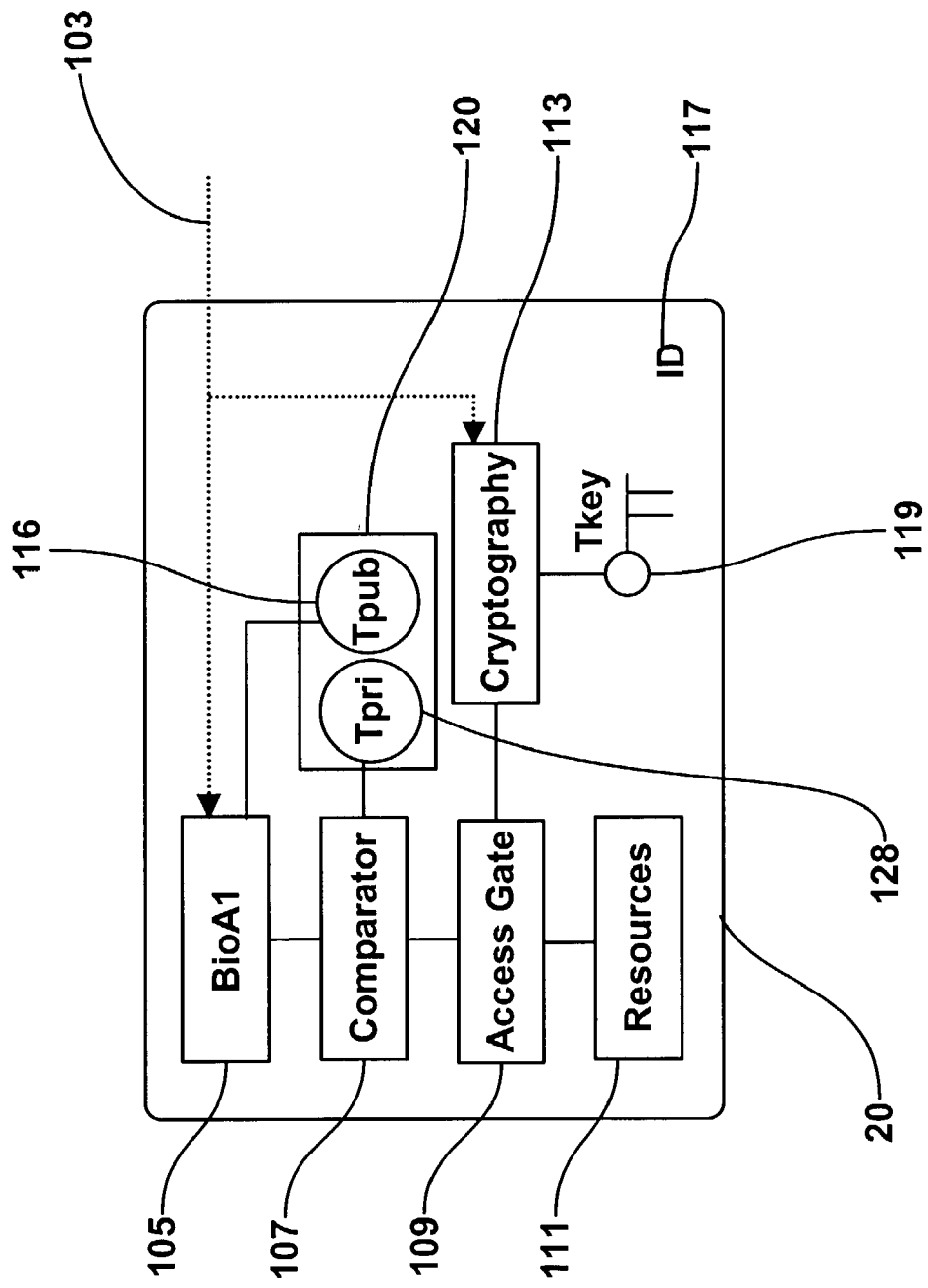
FIG. 1A—is a detailed block diagram illustrating the associated components included in a security token related to the invention.

FIG. 1A depicts the associated components installed in the security token including a first biometric processing applet BioA1 105. The first biometric processing applet BioA1 105 is used to identify and extract data points prescribed by a public portion Tpub 116 of a biometric template 120 for comparison with reference data points included in a private portion Tpri 128 of the biometric template 120. The biometric processing applet BioA1 105 is modularized and may be replaced by another biometric processing algorithm if improved recognition of incoming biometric samples is accomplished by the replacement.

The data pathway 103 may either address the first biometric processing applet BioA1 105 or a cryptographic module 113 by selecting an appropriate application identifier (AID) unique to the specific module. A comparator module 107 is used to compare the processed result received from the first biometric processing applet BioA1 105 against the pre-established private portion Tpri 128 of the biometric template 120.

An access gate module 109 controls access to token resources 111. The access gate module 109 allows verified access to the token resources 111 from verification signals received from either the comparator module or the cryptographic module 113. In the preferred embodiment of the invention, symmetric cryptography methods are employed to minimize key storage and processing requirements of the security token. It should be appreciated by one skilled in the art that asymmetric cryptography mechanisms will work as well.

The cryptographic module 113 includes an associated symmetric cryptographic key Tkey 119. The cryptographic key Tkey 119, or derivations thereof, is used to encrypt the biometric template 120 for secure transport to the stateless server 40, serves to authenticate an incoming verification result received by the security token using a symmetric algorithm included in the cryptographic module 113 and provides a basis for generating sessions keys for use in secure messaging between the stateless server 40 and security token 20. The symmetric authentication algorithm included in the cryptography module 113 may utilize DES, 3DES, AES or equivalent methodologies.

A unique token identifier ID 117 is included in the security token to identify the token to external resources. The unique identifier ID 117 may be the internal token's serial number, a derivation thereof, or another constant data string.

Figure 1B:
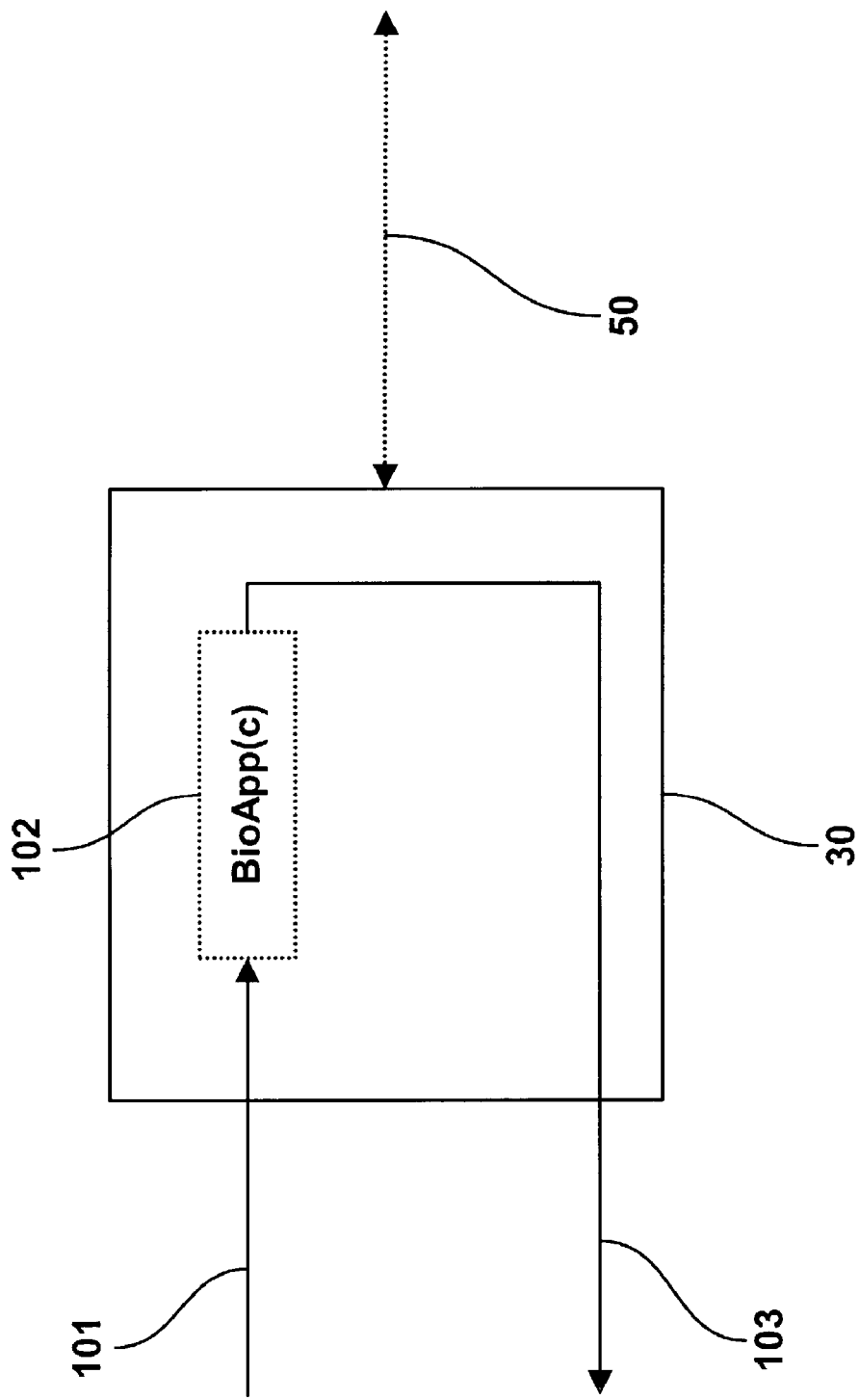
FIG. 1B—is a detailed block diagram illustrating the associated components including an optional pre-processing local client related to the first embodiment of the invention.

Referring to FIG. 1B, the local client 30 includes an optional pre-processing biometric application BioApp(c) 102 for use by a full computer system such as a desktop personal computer to extract digital information from an image supplied by the biometric scanner 10 and perform digital image enhancements. The optional preprocessing application BioApp(c) 102 is shown in dotted lines to illustrate optional use. In situations where the client is an integrated scanning device and security token reader, pre-processing may be limited or not present at all. The extracted biometric samples are then sent 103 to the security token 20 for processing and verification. The client 30 is in processing communications with the stateless server 40 using the telecommunications link 50. The client 30 provides the telecommunications interface between the stateless server 40 and the security token 20.

Figure 1C:
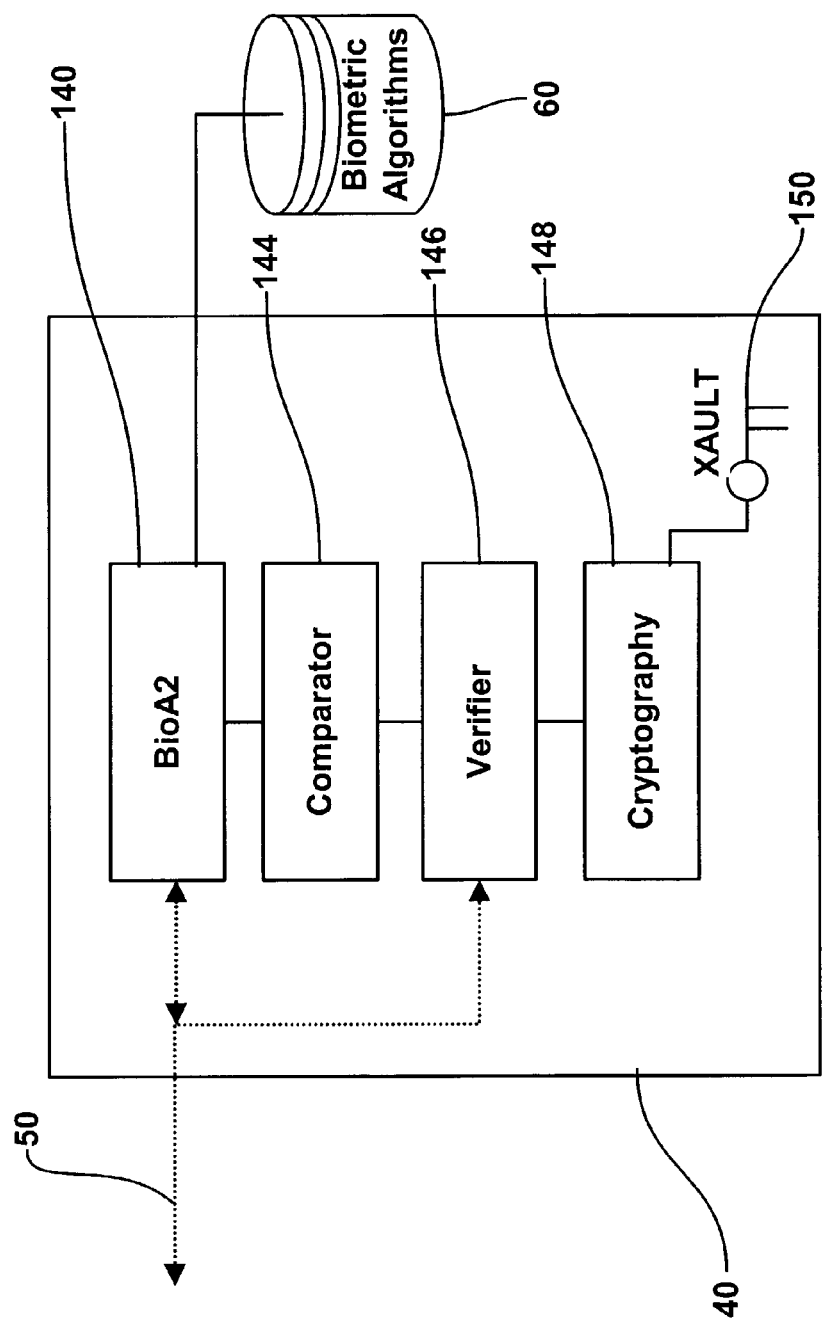
FIG. 1C—is a detailed block diagram illustrating the associated components included in a stateless server related to the first embodiment of the invention.

The stateless server 40 and its associated modules is shown in FIG. 1C. The stateless server includes a second biometric processing algorithm BioA2 140 for processing the biometric sample received from the security token 20. The biometric processing algorithm BioA2 140 is retrieved from storage 60 based on the first set of biometric processing parameters received from the security token 20 and is a more powerful equivalent to the biometric processing applet BioA1 105 employed by the security token 20.

The stateless server 40 receives the biometric sample, a cryptogram 227 containing the biometric template and the first set of biometric processing parameters from the security token 20 following an initial verification failure by the security token 20. The combined biometric processing algorithm BioA2 140 and stateless server 40 have considerably greater processing capabilities than that of the security token 20. A comparator module 144 is used to compare the processed result received from the biometric processing application BioA2 140 against the received biometric reference.

A verifier module 146 determines if the results received from the comparator module 144 are within a prescribed tolerance range to be considered a match. A cryptographic module 148 is provided to regenerate a duplicate of the unique token key 119, or a derivation thereof, using the supplied unique identifier 117 to diversify a master key XAULT 150 associated with the cryptography module 148. The unique token key 119 will be used to unlock the security token 20 if the stateless server 40 successfully verifies the extracted biometric sample. The cryptography module 148 utilizes an equivalent of the symmetric methodologies employed by the cryptography module 113 installed inside the security token 20. The telecommunications link 50 facilitates the data exchanges between the security token 20 and the stateless server 40.

Figure 2:
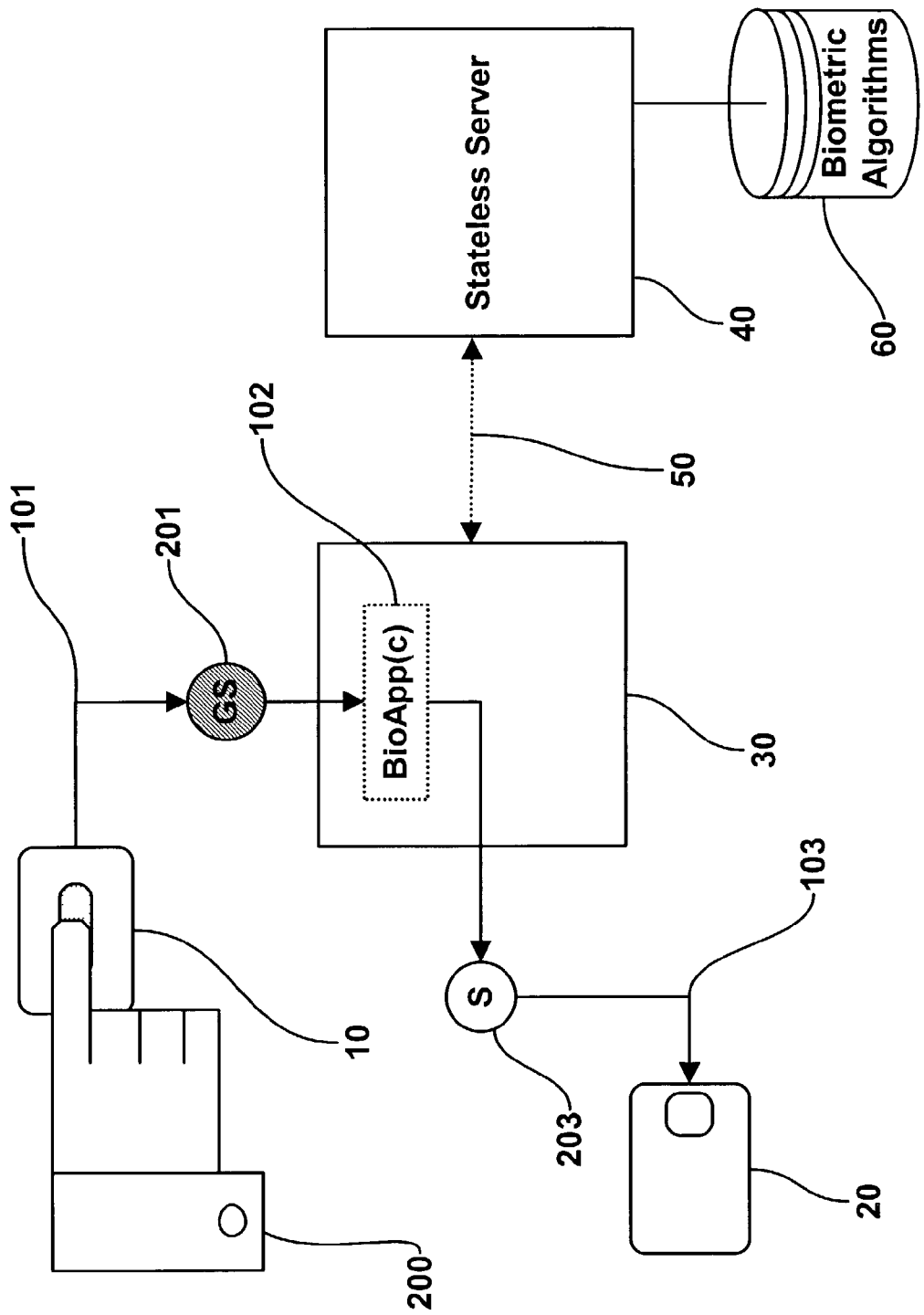
FIG. 2—is a general block diagram illustrating the collection of a biometric sample and routing of the biometric sample to a security token for processing.

In FIG. 2, the collection of a biometric sample is depicted. The user 200 supplies a biometric sample, (shown as a fingerprint for example only,) by placing a finger on the biometric scanner 10. A gray scale image sample GS 201 is processed by the biometric application BioApp(c) 102 resulting in an extracted biometric sample S 203. The extracted biometric sample S 203 is routed 103 to the security token 20 for verification.

Figure 2A:
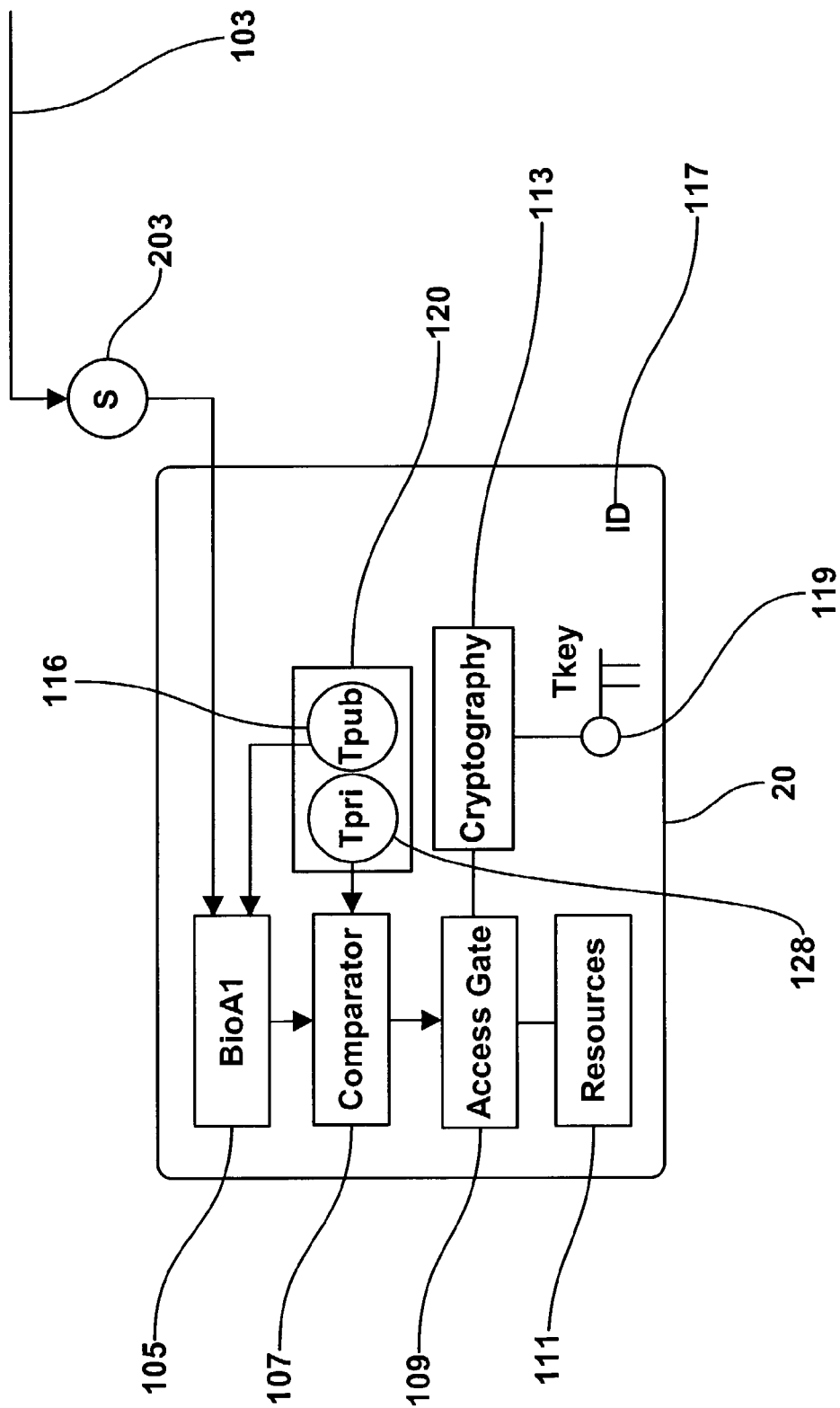
FIG. 2A—is a detailed block diagram illustrating the initial processing of the biometric sample by a first biometric processing algorithm contained inside the security token.
Figure 2B:
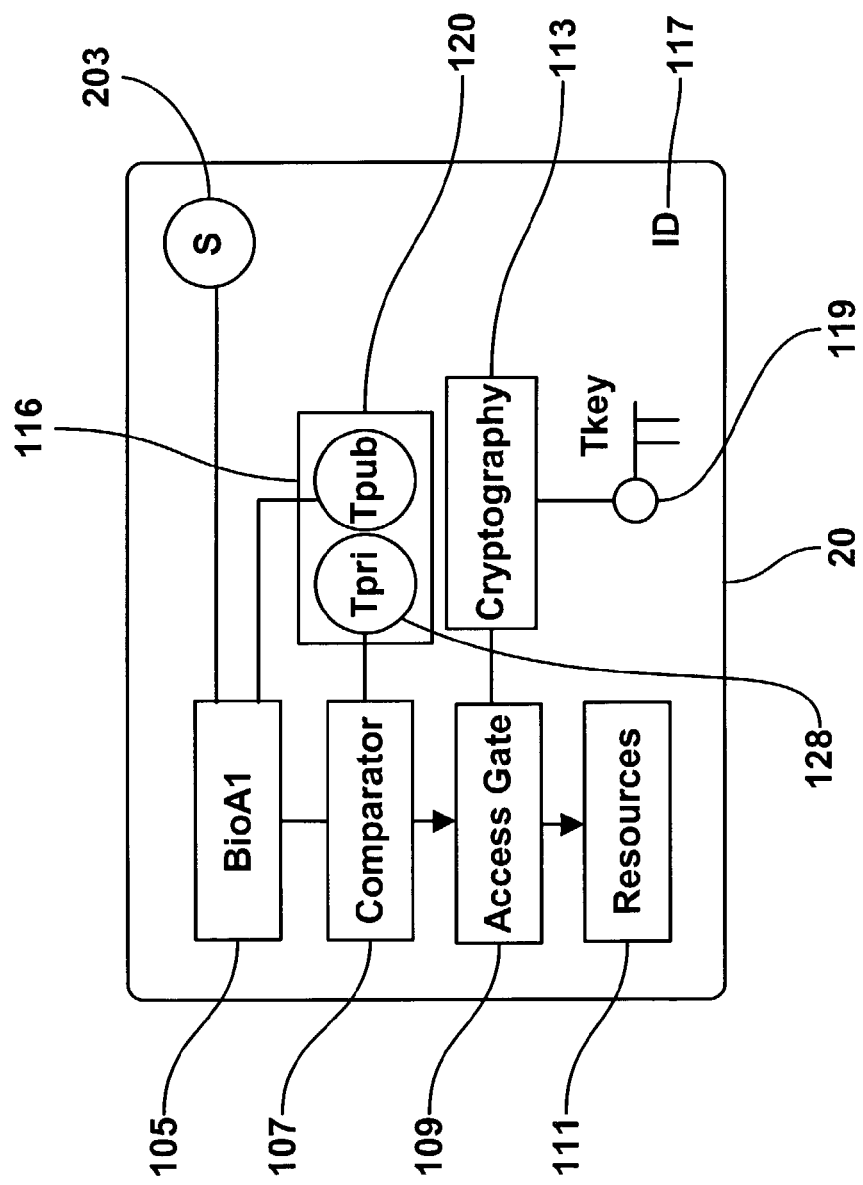
FIG. 2B—is a detailed block diagram illustrating successful verification of the biometric sample by the first biometric processing algorithm allowing access to resources contained inside the security token.
Figure 2C:
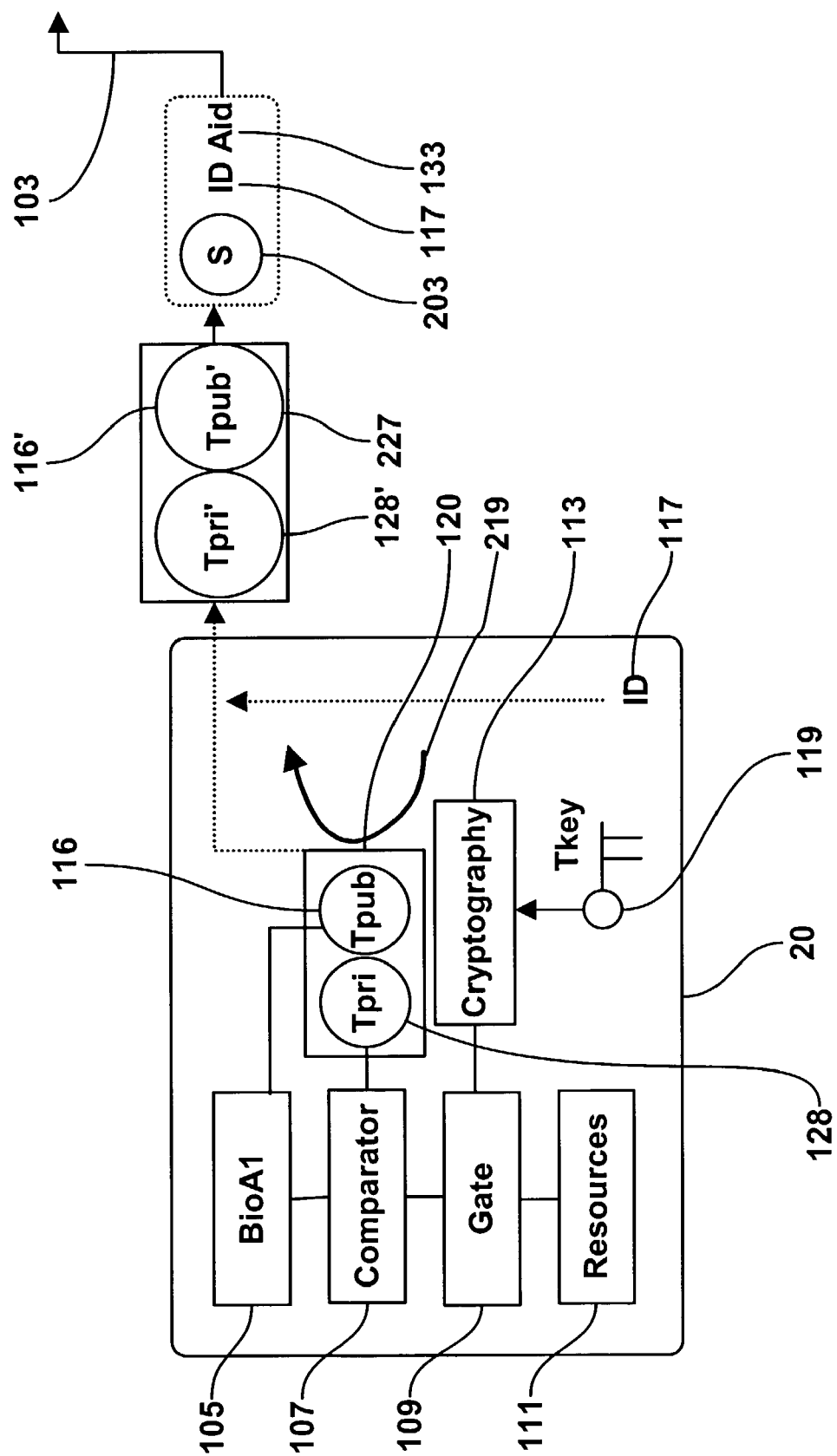
FIG. 2C—is a detailed block diagram illustrating unsuccessful verification of the biometric sample by the first biometric processing algorithm and export of a first set of parameters necessary to attempt verification using a stateless server.

In FIG. 2A, the biometric sample S 203 is first processed by the biometric processing applet BioA1 105 using the public portion Tpub 116 of the biometric template 120 and compared against the private portion Tpri 128 of the biometric template 120 using the comparator module 107. Referring to FIG. 2B, if the verification process is successful, the comparator module 107 signals the access gate module 109 which allows access to security token resources 111. In FIG. 2C, if the security token verification process is unsuccessful, the biometric template 120 is encrypted 219 by the cryptography unit 113 using the token key Tkey 119 or a derivative thereof. The resulting cryptogram 227, biometric sample S 203 and the first set of biometric processing parameters are sent 103 to the stateless server 40. The first set of biometric processing parameters includes the unique token identifier 117 and the biometric algorithm descriptor 133.

Figure 3:
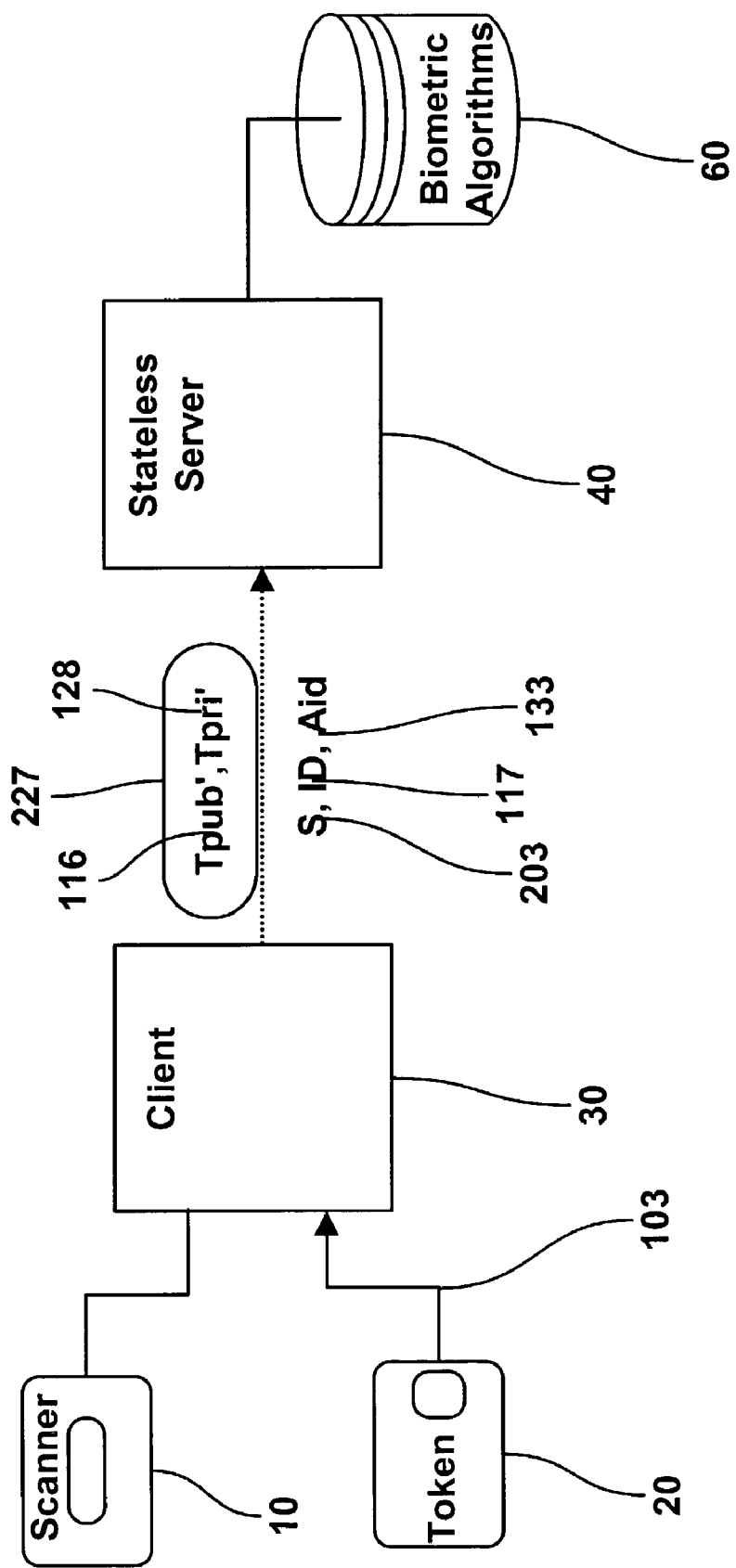
FIG. 3—is a generalized block diagram illustrating the transfer of the first set of parameters from the security token to the stateless server.

In FIG. 3, the transfer of the encrypted biometric template 227, biometric sample S 203, unique identifier ID 117 and biometric algorithm descriptor Aid 133 are shown being sent 103 from the security token 20 via the client 30 over the telecommunications link 50 to the stateless server 40 to attempt a second verification.

Figure 3A:
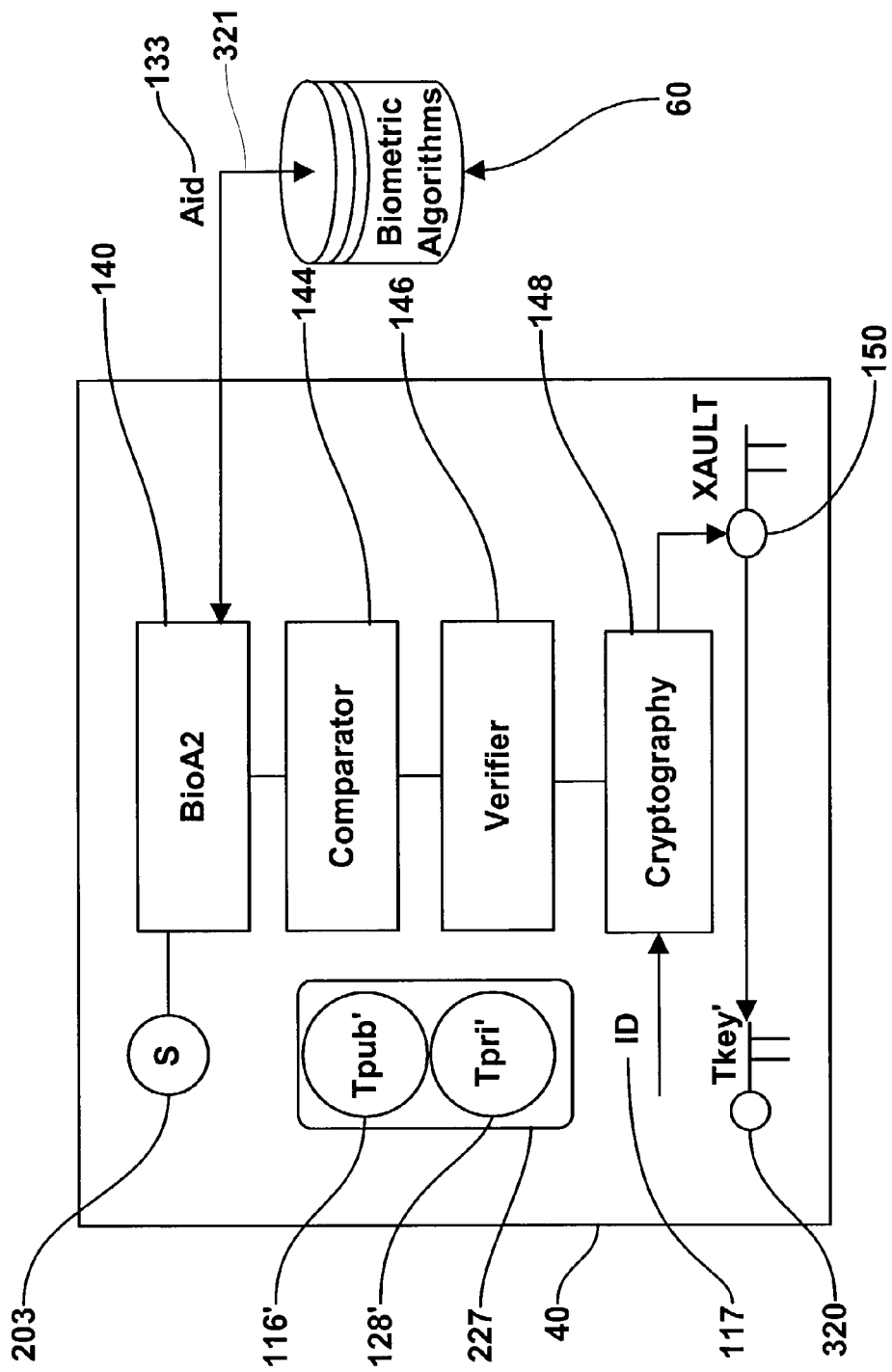
FIG. 3A—is a detailed block diagram illustrating biometric algorithm retrieval and generation of a unique token key for decryption of one of the received parameters.

Referring to FIG. 3A, the incoming biometric algorithm descriptor Aid 133 is used to retrieve 321 the appropriate biometric processing algorithm 60 from storage and is operatively installed as the biometric processing algorithm BioA2 140. The incoming unique token identifier 117 is used to regenerate the security token key Tkey' 320 using the cryptography module 148 by diversifying the master key XAULT 150 with the unique identifier 117. Derivatives of the token key are envisioned as well. The diversification method may include XOR, DES, 3DES, AES or other equivalent method.

Figure 3B:
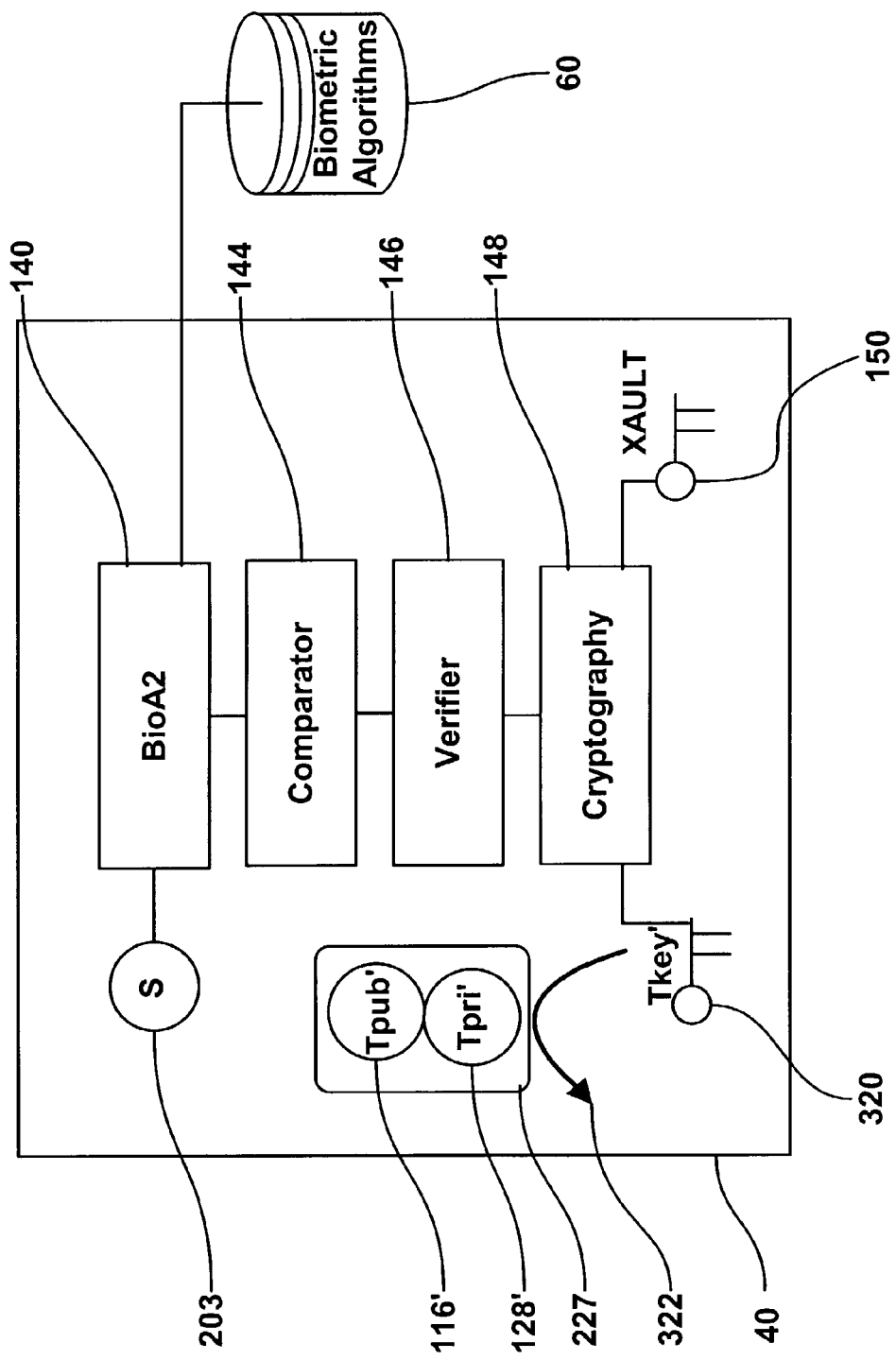
FIG. 3B—is a detailed block diagram illustrating the use of the unique token key for decryption of one of the received parameters.
Figure 3C:
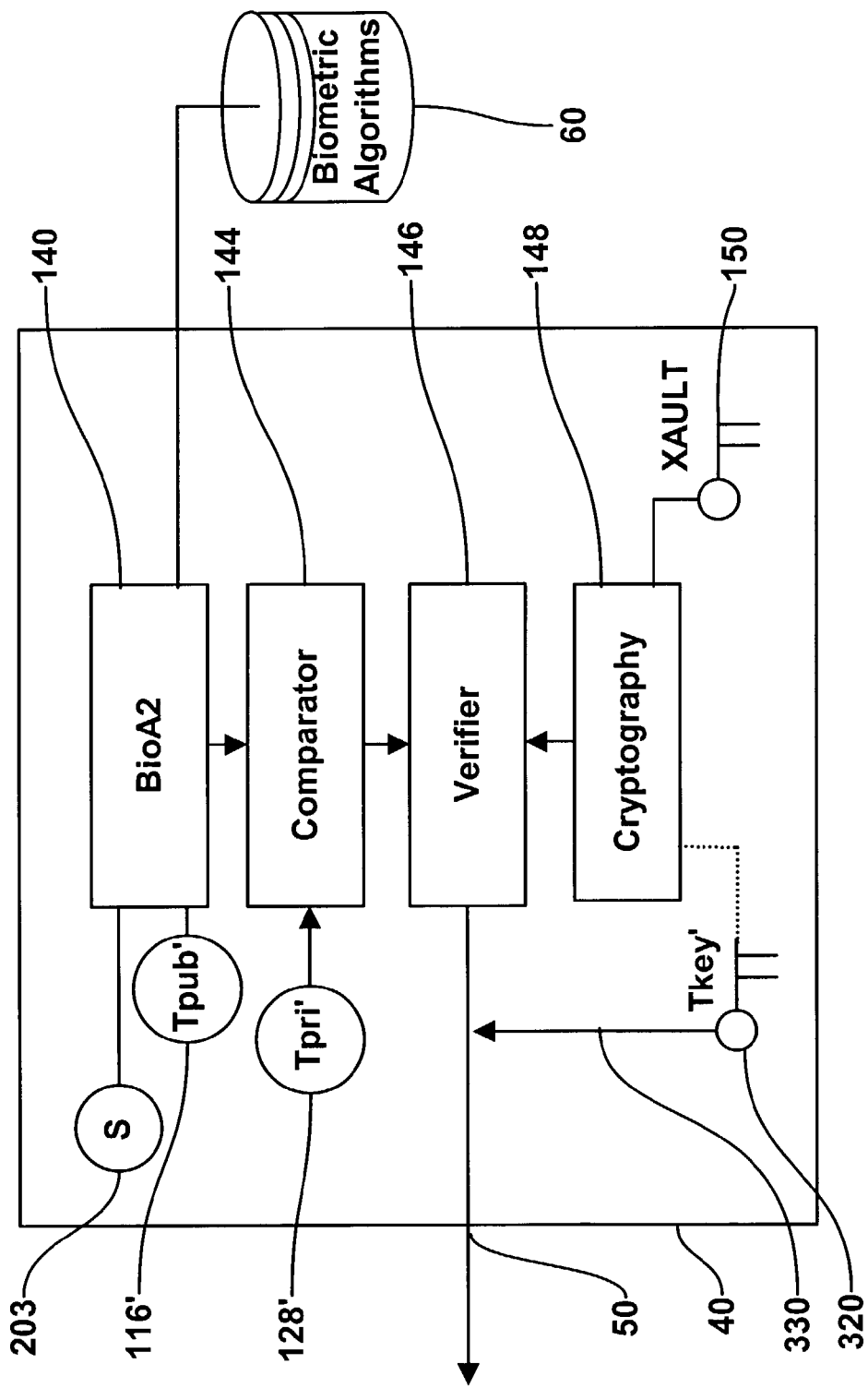
FIG. 3C—is a detailed block diagram illustrating successful verification of the biometric sample by a second biometric processing algorithm and transmission of the unique token key to unlock the security token.

In FIG. 3B, the regenerated token key (or derivative thereof) Tkey' 320 is used to decrypt 322 the cryptogram 227 containing the biometric template. Continuing with FIG. 3C, the decrypted public portion of the template Tpub' 116' is used by the biometric processing algorithm BioA2 140 to extract the prescribed data points from the biometric sample S 203. The comparator module 144 compares the extracted data points supplied by the biometric processing application BioA2 140 against the private portion Tpri' 128 of the biometric template 120'.

If the verifier module 146 determines that a match has occurred within specified tolerances, the regenerated token key Tkey' 320 is then securely sent 50 to the security token 20. As an alternative to sending the regenerated token key Tkey' 320, either a host authentication by the security token 20 or a mutual authentication process may be performed.

Figure 3D:
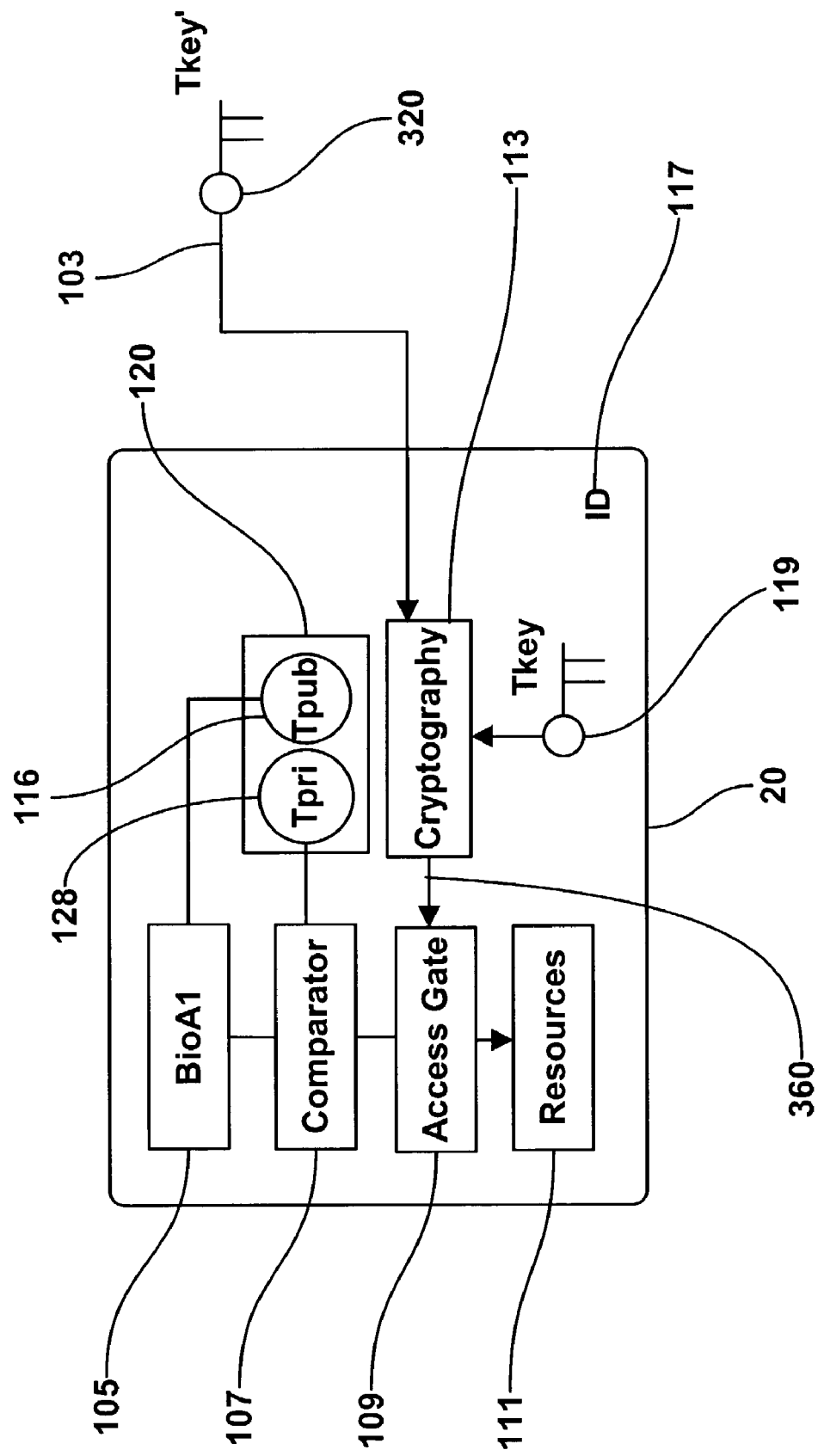
FIG. 3D—is a detailed block diagram illustrating the unlocking of the security token and allowing access to resources contained inside the security token.

Referring to FIG. 3D, the regenerated token key Tkey' 320 is received by the security token 20 and verified against the original token key Tkey 119 using the cryptography module 113. The cryptography module then signals 360 the access gate module 109 to allow access to the resources 111.

Figure 3E:
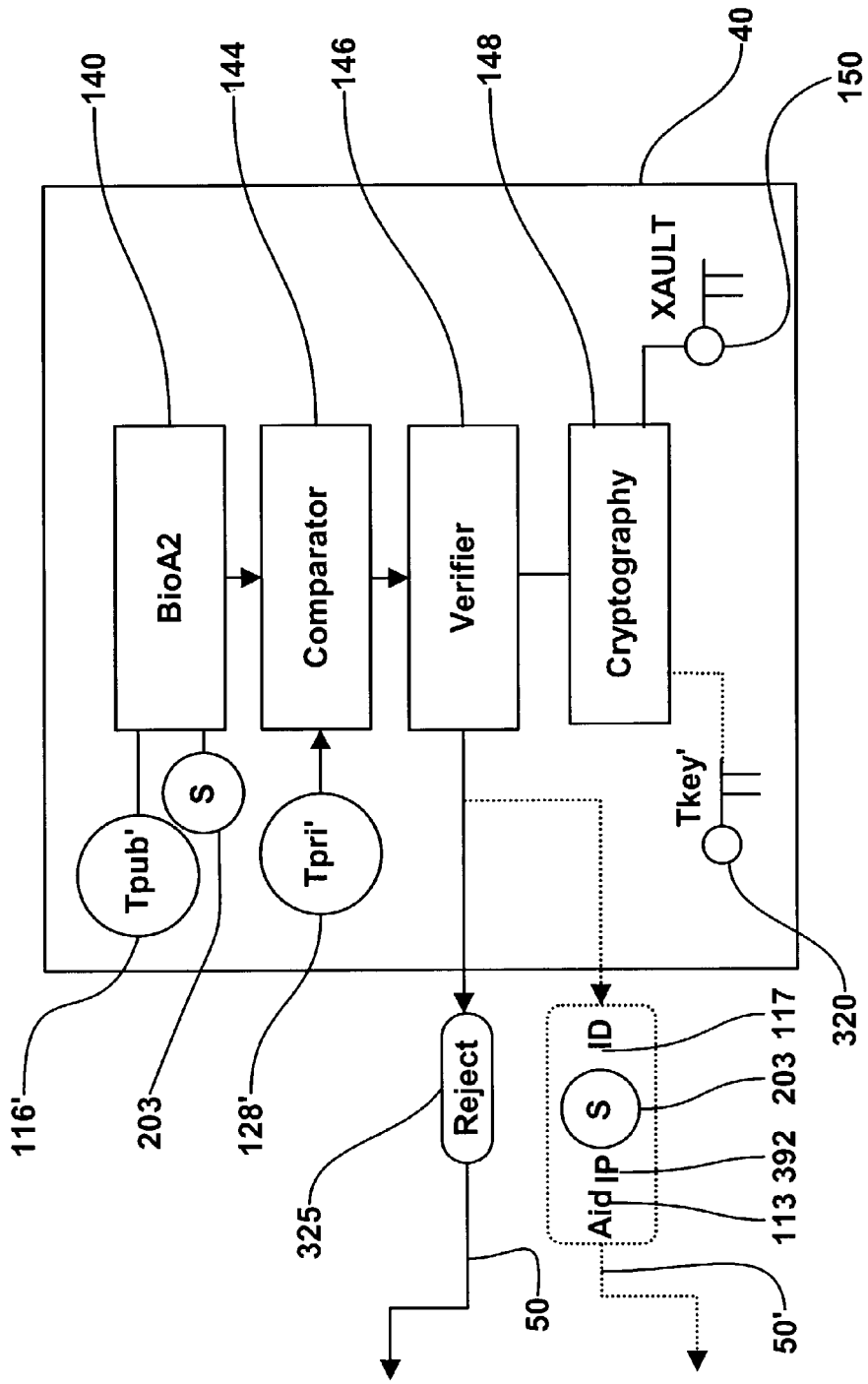
FIG. 3E—is a detailed block diagram illustrating unsuccessful verification of the biometric sample by the second biometric processing algorithm and transmission of either a 'reject' signal to the security token or a second set of parameters to be processed by a third biometric processing algorithm associated with a second embodiment of the invention.

In FIG. 3E, a failed second verification attempt by the stateless server 40 is depicted. This transaction occurs when the verifier module 146 determines that the biometric sample S 203 does not fall within the pre-established tolerance range set for the biometric template. In the first embodiment of the invention, a 'reject' signal 325 is returned 50 to the security token 20. The 'reject' signal may include the ability to lock the security token 20 from further usage. In the second embodiment of the invention, the sample S 203 and a second set of biometric processing parameters is sent 50' to a stateful server for further processing and verification as described in the discussion which follows for FIG. 4. The second set of biometric processing parameters includes the unique token identifier ID 117, biometric algorithm descriptor Aid 113 and the telecommunications address of the client IP 392.

Figure 3F:
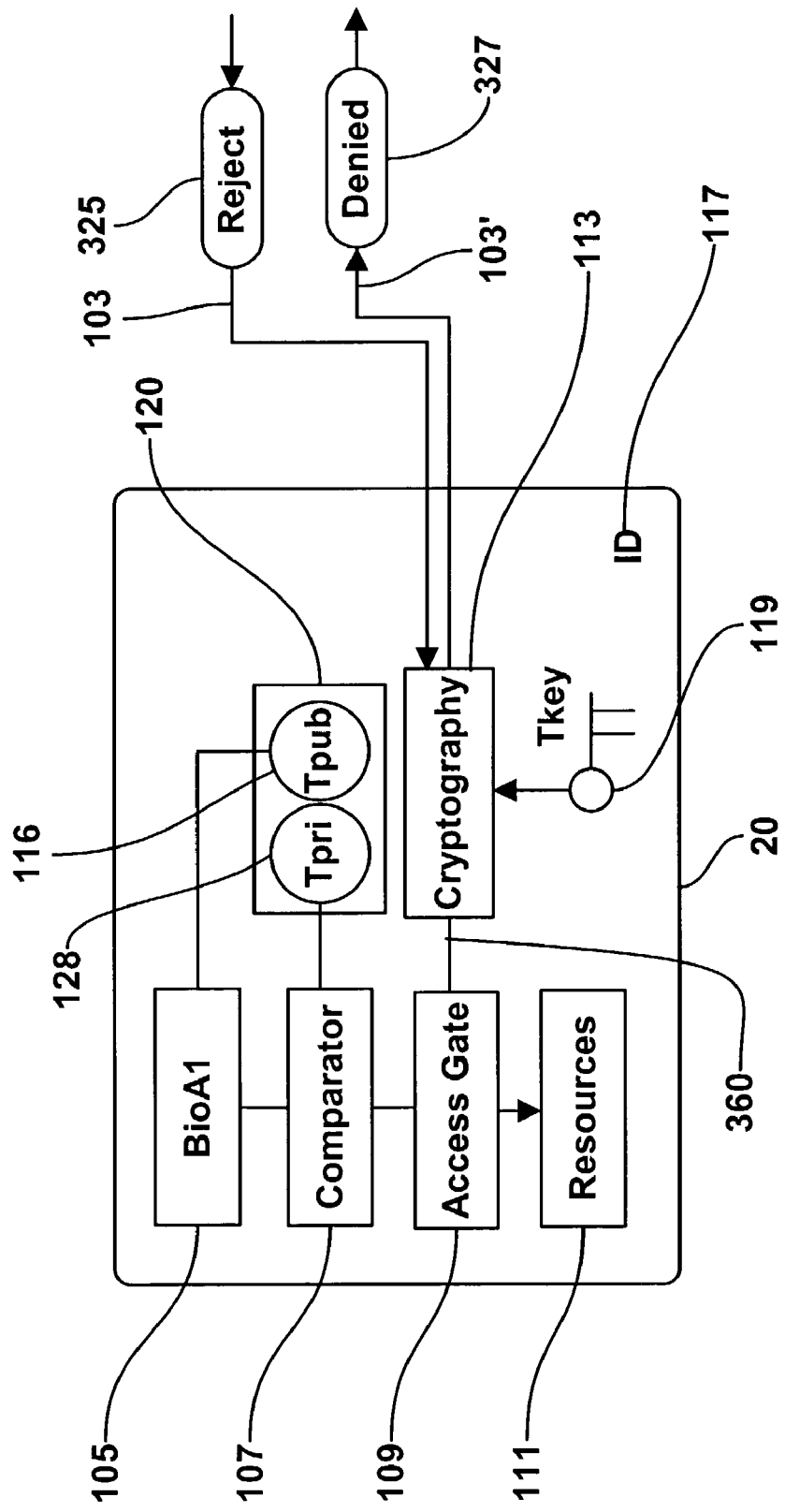
FIG. 3F—is a detailed block diagram illustrating receipt of the rejection set from the second biometric processing algorithm and final access denial by the security token.

FIG. 3F illustrates the actions performed by the security token upon receipt of the 'reject' signal 325 sent from the stateless server 40. The cryptography module 113 generates an access denied signal 327 which is returned 103' to a user interface associated with the client 30 ending the verification process.

Figure 4:
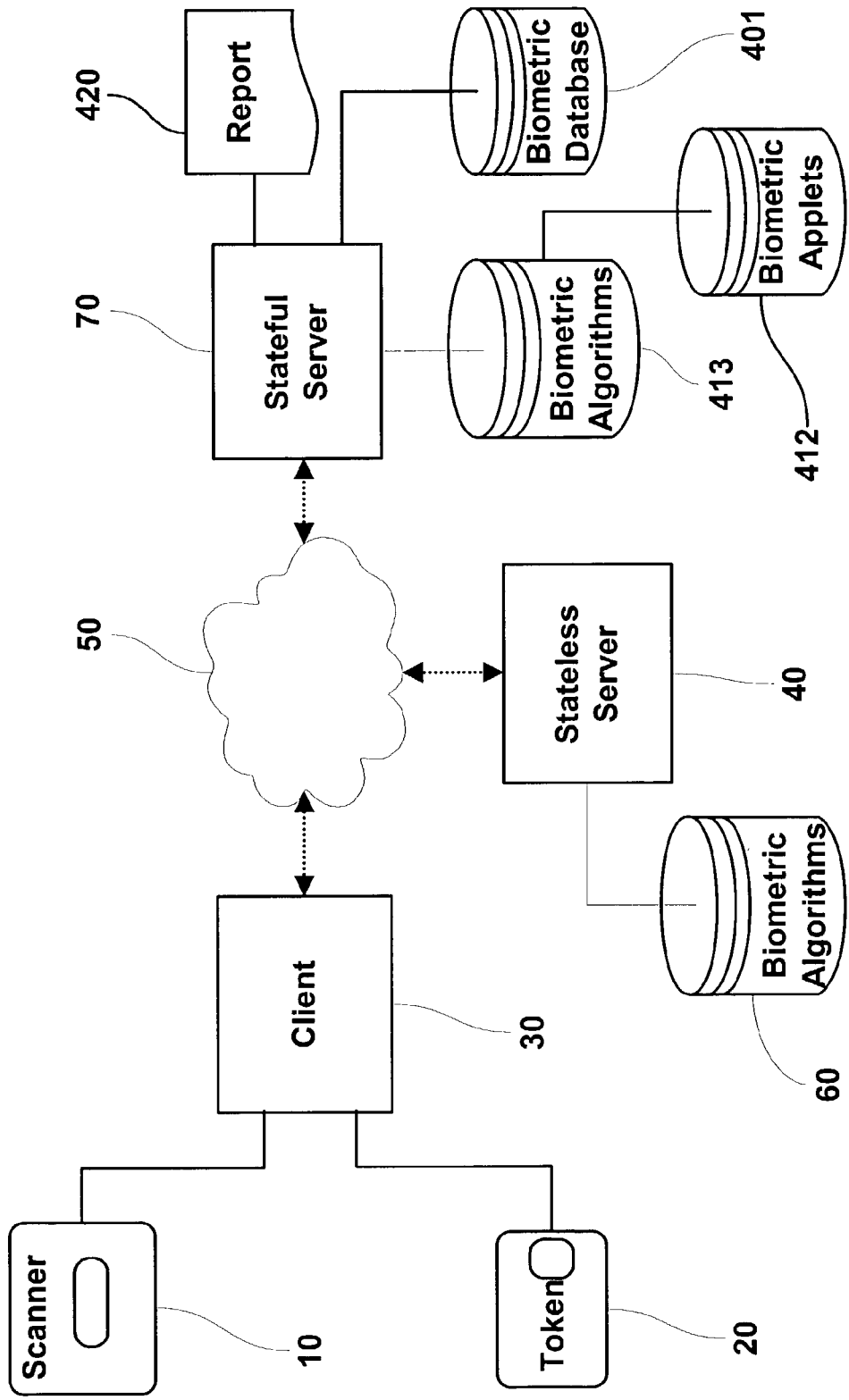
FIG. 4—is a generalized block diagram illustrating the second embodiment of the invention.

In FIG. 4, a general block diagram depicting the second embodiment of the invention is provided. The second embodiment of the invention adds a stateful server 70 to the verification process. The stateful server 70 includes the necessary hardware and software to communicate over the telecommunications link 50, process incoming biometric samples sent by the stateless server 40, the ability to query an associated biometric database 401 containing a plurality of biometric templates and the ability to unlock the security token 20 if the resulting verification process is successfully completed. The biometric templates retrievable using the biometric database 401 are preserved from each authorized user's original enrollment and contains higher resolution (i.e. more data points) than those contained within the security token 20.

The stateful server includes retrievably stored biometric processing algorithms 413. The appropriate biometric processing algorithm is operatively loaded into the stateful server 70 based on the received biometric algorithm descriptor Aid 133. A second set of biometric processing algorithms 413 includes downloadable biometric processing applets 412 to replace the existing biometric processing applet BioA1 105 contained in the security token 20. The replacement mechanism is described in the discussion accompanying FIGS. 4F and 4G. The stateful server 70 also includes the ability to generate an audit trail 420 of verification efforts conducted by both the stateless server 40 and stateful server 70.

Figure 4A:
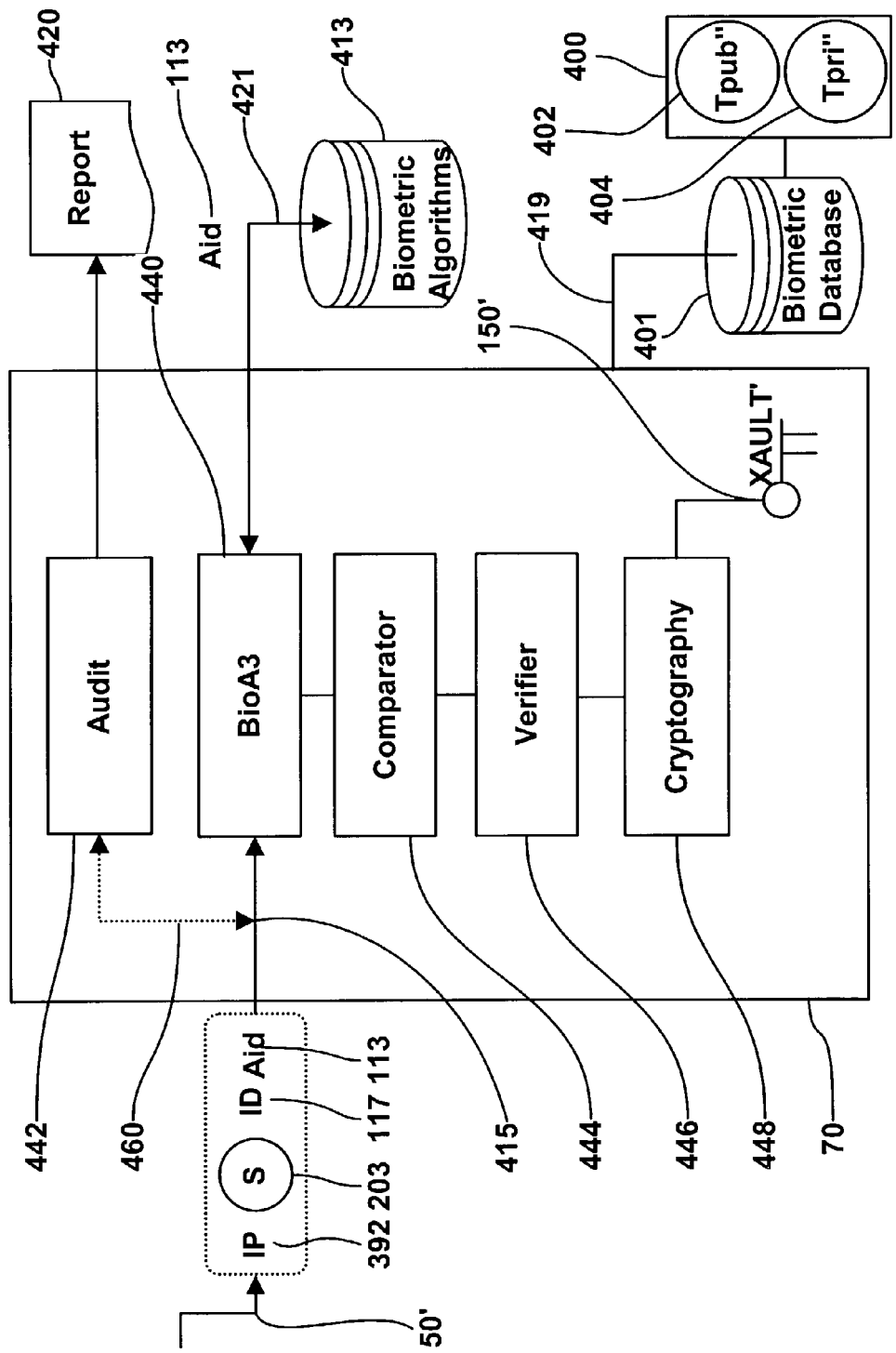
FIG. 4A—is a detailed block diagram illustrating receipt of the second set of parameters by a stateful server containing a third biometric processing algorithm including a biometric template database.
Figure 4B:
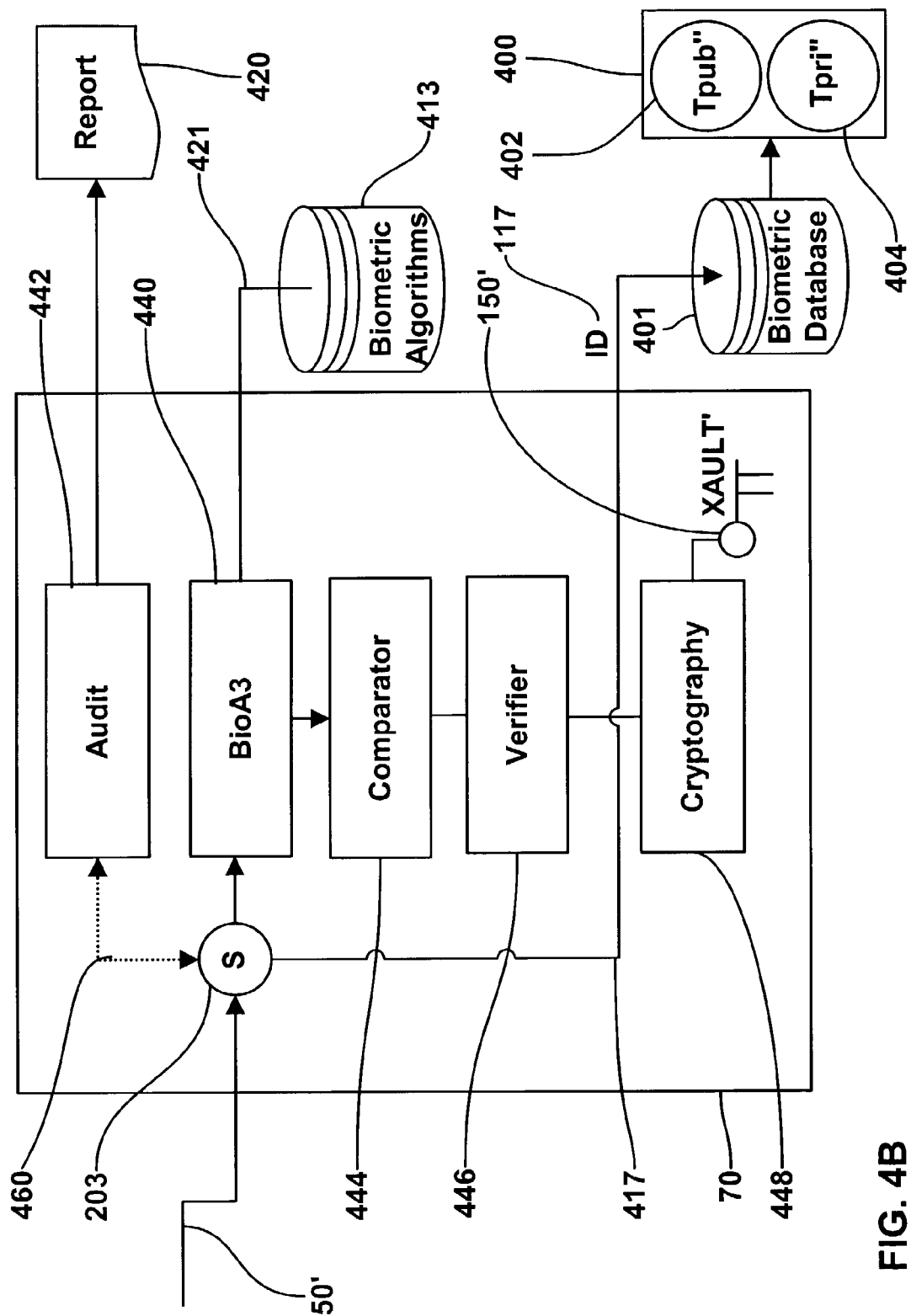
FIG. 4B—is a detailed block diagram illustrating the processing of the second set of parameters by the third biometric processing algorithm and comparison of the processed results against stored biometric templates included in the biometric database.

Referring to FIG. 4A, the biometric sample S 203, unique token identifier ID 117, address of the client IP 392 and biometric algorithm descriptor Aid 133 are received 415 by the stateful server 70 from the stateless server 40 over the telecommunications link 50'. The biometric algorithm descriptor Aid 133 is used to retrieve 421 the appropriate biometric processing algorithm from storage 413 which is then operatively installed BioA3 440 inside the stateful server 70. The receipt of the data causes an audit signal 460 to be generated which allows the audit module 442 to record transaction activities in a report 420. Continuing with FIG. 4B, the unique token identifier ID 117 is used to retrieve 417 the higher resolution biometric template 400 from the biometric database 401.

Figure 4C:
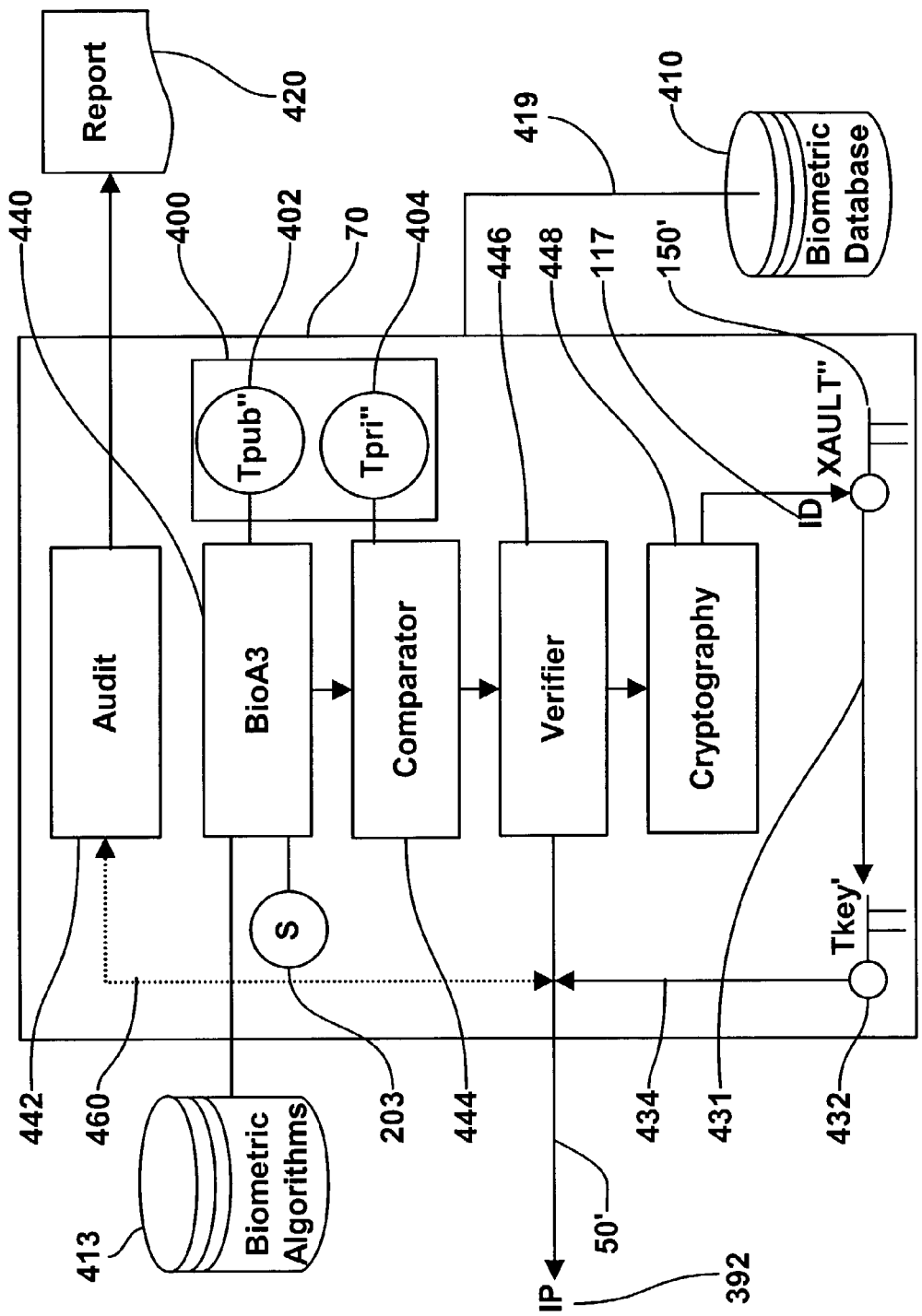
FIG. 4C—is a detailed block diagram illustrating successful verification of the biometric sample, generation of the unique token key and subsequent transfer of the generated unique token key to the security token to unlock the security token.

In FIG. 4C, the public portion of the biometric template Tpub" 402 is used to process the sample S 203 using the third biometric processing algorithm BioA3 440. The processed results from the third biometric processing algorithm BioA3 440 are then compared against the private portion of the biometric template Tpri" 404 by the comparator module 444.

The verifier module 446 determines if the results received from the comparator module 444 are within the prescribed tolerance range to be considered a match. If a match is determined, the unique token identifier ID 117 is used to regenerate the token key Tkey' 432 or a derivative thereof using the cryptography module 448 and a second master key XAULT' 150'. The regenerated token key Tkey' 432 or a derivative thereof, is then securely sent 50' to the security token 20 using the client address IP 392 and processed as described in the discussion for FIG. 3D above. The stateful server 70 incorporates the equivalent cryptography methods employed by the stateless server 40 described above. As previously described, the continuing transactions may be recorded 460 by the audit module 442 and reported 420 for future review.

Figure 4D:
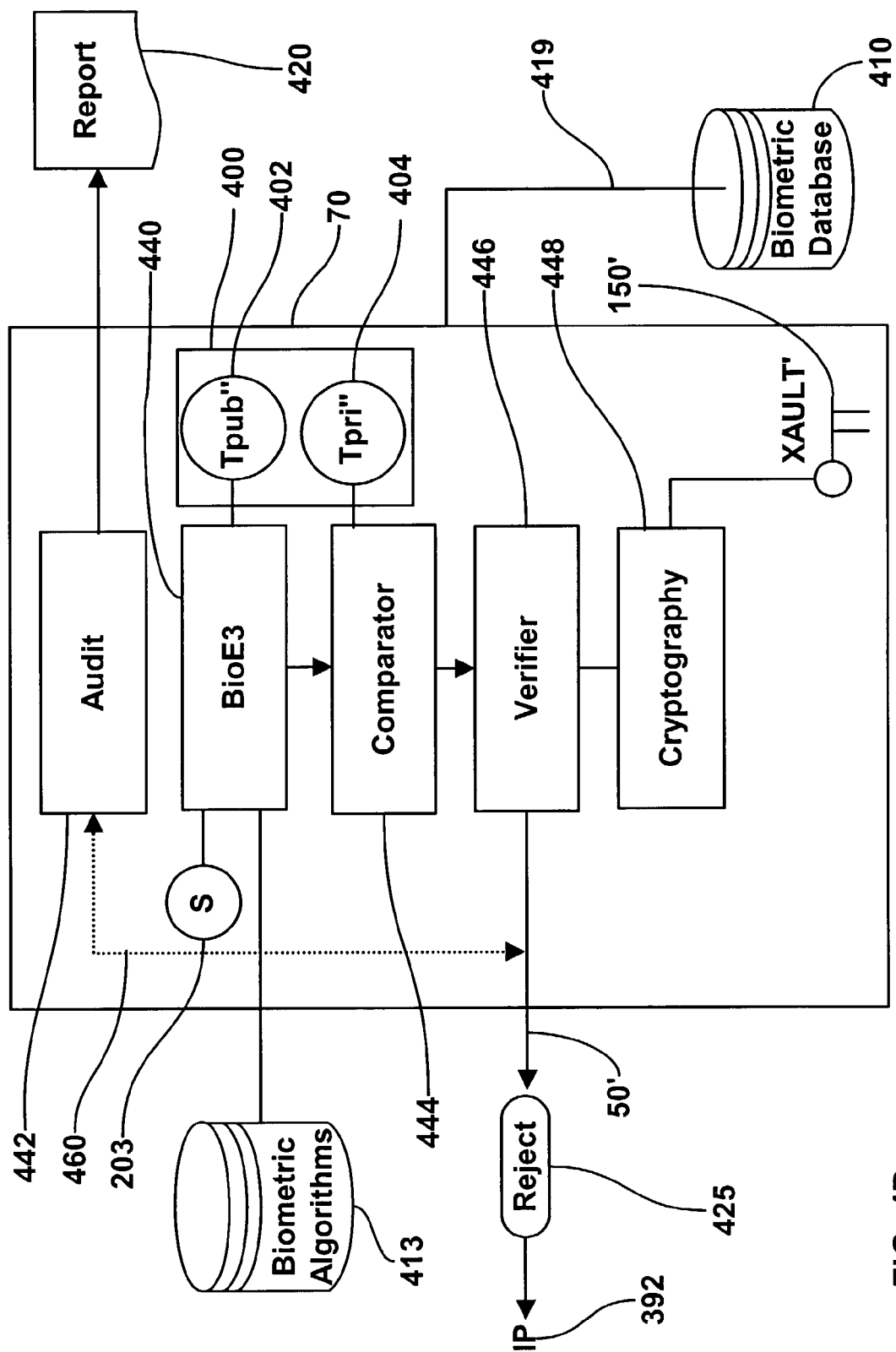
FIG. 4D—is a detailed block diagram illustrating unsuccessful verification of the biometric sample and transmission of a 'reject' signal to the security token.

Referring to FIG. 4D, if the verifier module 446 determines that a match has not been obtained, a 'reject' signal 425 is sent 50' to the security module 20 using the client address IP 392 and processed as discussed in the discussion for FIGS. 3E and 3F above. Optional additional sample S 203 processing may be included which is described in the discussion which follows for FIGS. 4E, 4F and 4G. As previously described, the continuing transactions may be recorded 460 by the audit module 442 and reported 420 for future review.

Figure 4E:
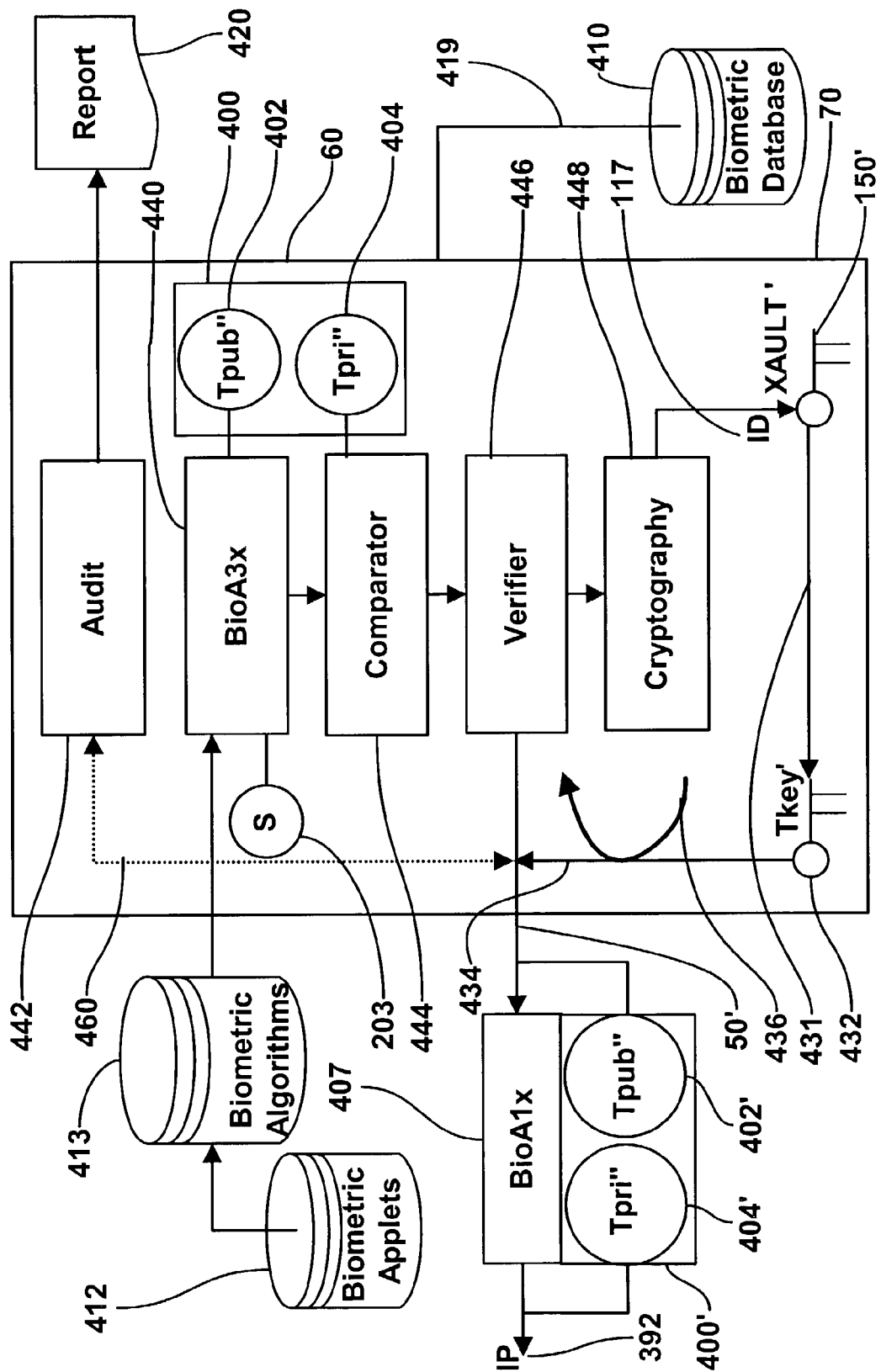
FIG. 4E—is a detailed block diagram illustrating the generation and encryption of a replacement biometric processing algorithm applet and associated biometric template.

In FIG. 4E, if the first verification attempt by the stateful server 70 is unsuccessful, a second attempt is performed using a different biometric processing algorithm Bio3Ax 441 retrieved from storage 413. If the second verification attempt by the stateful server 70 is successful, the security token 20 is unlocked as detailed in the discussion accompanying FIG. 4C above. Optionally, a replacement biometric processing applet 407 BioA1x is retrieved from Biometric Applets storage 412 which utilizes the equivalent biometric processing algorithm BioA3x successfully performing the verification on the stateful server 70.

A replacement biometric template 400' is generated for download and use by the security token 20. The replacement biometric template 400' and replacement biometric processing applet BioA1x 407 are encrypted 436 using the token key Tkey' 432 or a derivation thereof before being sent to the telecommunications address of the client IP 392 over the telecommunications link 50'. As previously described, the continuing transactions may be recorded 460 by the audit module 442 and reported 420 for future review.

Figure 4F:
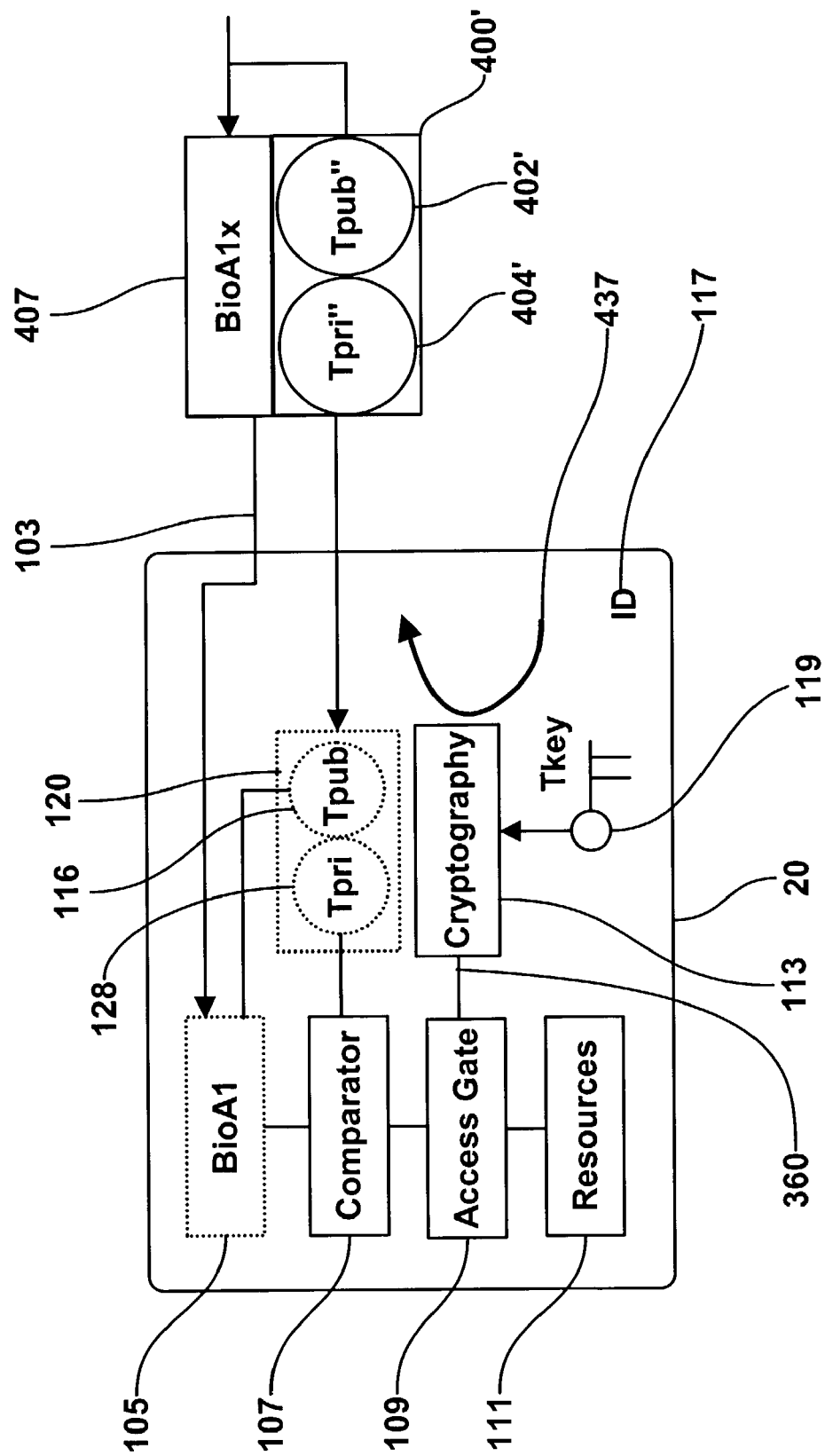
FIG. 4F—is a detailed block diagram illustrating the decryption and installation of the replacement biometric processing algorithm applet and associated biometric template.

In FIG. 4F, the cryptogram containing the replacement biometric template 400' and replacement biometric processing applet BioA1x 407 are decrypted 437 using the token key Tkey 119 and operatively installed inside the security token, replacing the existing biometric processing applet BioA1 105 and biometric template 120. As previously described, the continuing transactions may be recorded 460 by the audit module 442 and reported 420 for future review.

Figure 4G:
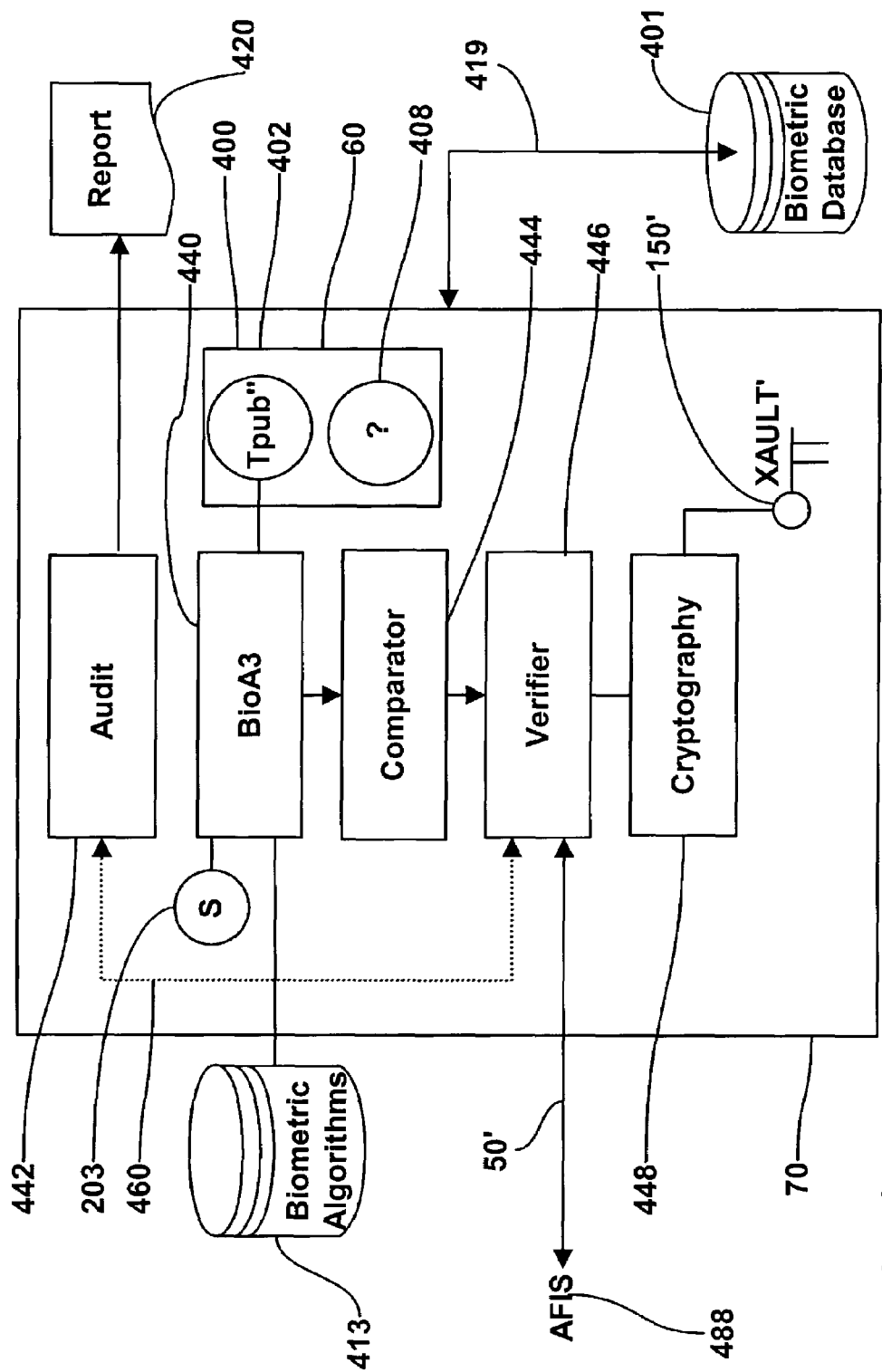
FIG. 4G—is a detailed block diagram illustrating a one-to-many database query in an attempt to identify an unknown user.

In FIG. 4G, if the second verification attempt using the different biometric processing algorithm BioA3x is unsuccessful, a one-to-many query 419 of enrolled biometric templates 401 is performed to attempt to identify the individual requesting access. If the query 419 does not find a close match, an optional query of an external biometric database may be performed 50', for example, sending a query to a national automated fingerprint identification system AFIS 488 or its equivalent for non-fingerprint biometric data. As previously described, the continuing transactions may be recorded 460 by the audit module 442 and reported 420 for future review.

Figure 5:
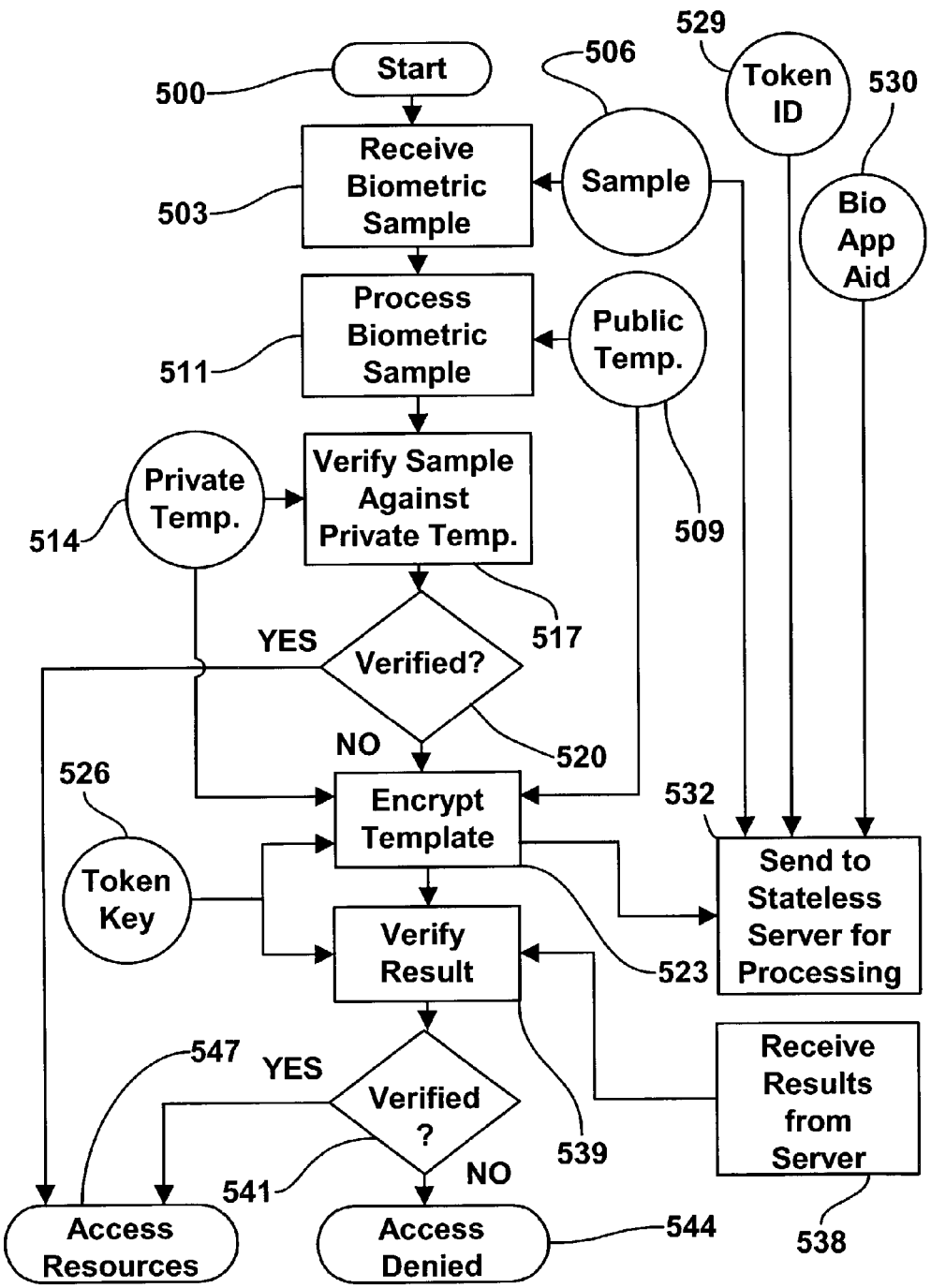
FIG. 5—is a flowchart illustrating the security token actions performed in the first embodiment of the invention.

FIG. 5, depicts a flowchart indicative of the steps to practice the first embodiment of the invention. The process is initiated 500 by a user generating a biometric sample. The biometric sample 506 is received 503 and processed 511 using a public portion of a biometric template 509 by a security token and first attempt to verify 517 the biometric sample against a private portion of the biometric template 514 is performed. If the first verification attempt 520 is successful, the user is allowed access to additional electronic resources 547.

If the first verification attempt 520 is unsuccessful, the public 509 and private portions 514 of the biometric template are encrypted 523 using a token key 526, or derivative thereof, and a symmetric algorithm and the resulting cryptogram sent to a stateless server 532 for processing. The sample 506 and a first set of parameters including a biometric algorithm descriptor 530 and the token identifier 529 are sent to the stateless server.

The results are returned by either the stateless server (first embodiment FIG. 6) or a stateful server (second embodiment FIGS. 7, 7A and 7B) 538 and verified 539 using the security token key 526 and the symmetric algorithm. If the verification attempt 541 is successful, the user is allowed access to security token resources 547. If the verification attempt 541 is unsuccessful, access is denied 544.

Figure 6:
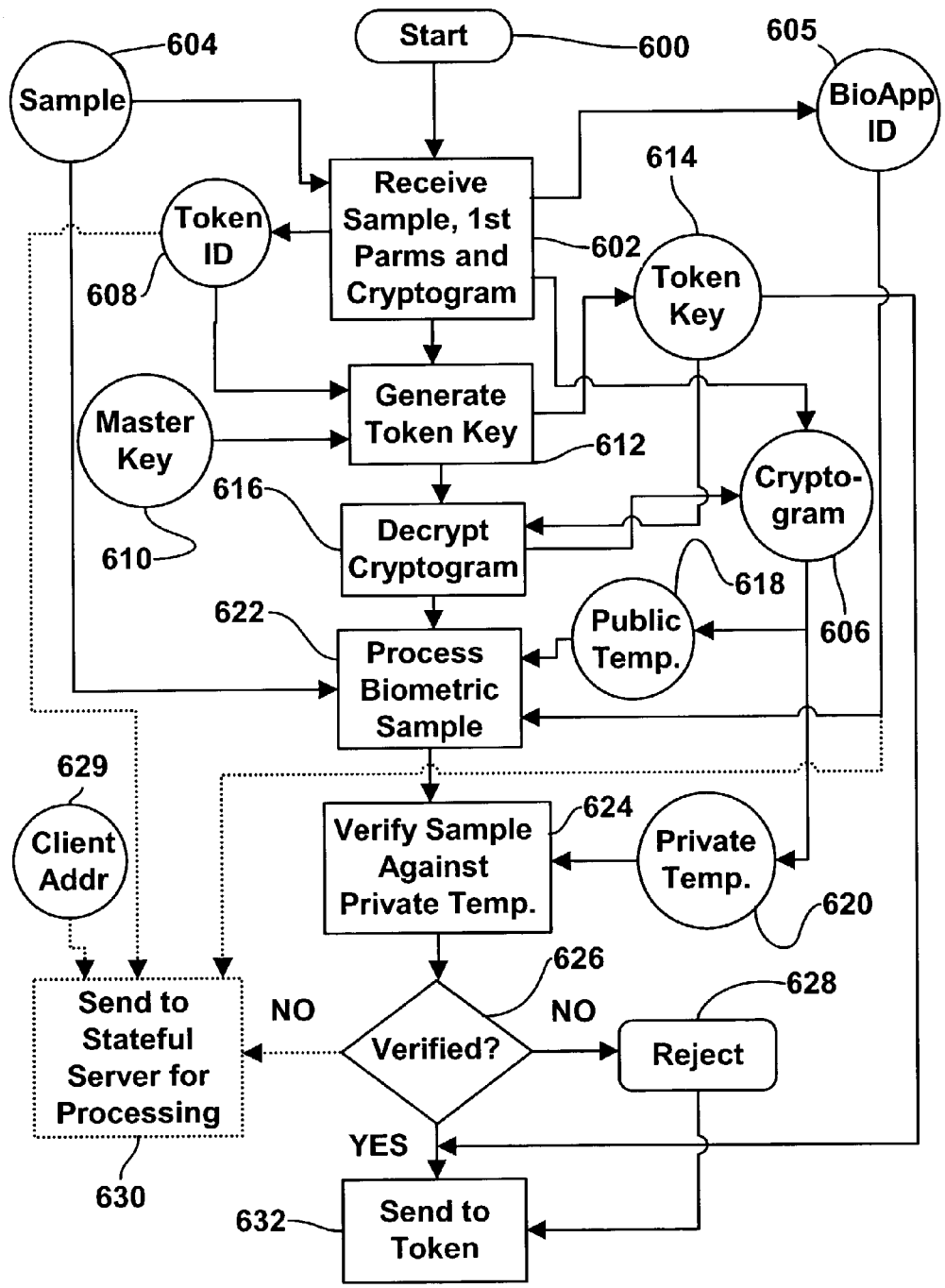
FIG. 6—is a flowchart illustrating the stateless server actions performed in the first embodiment of the invention.

Referring to FIG. 6, depicts a flowchart indicative of the steps to practice the first embodiment of the invention using the stateless server. The process is initiated 600 by receipt 602 of the sample 604, cryptogram 606 and a first set of parameters including the token identifier 608 and biometric algorithm descriptor 605. A pre-existing master key 610 is diversified by the token identifier 608 to regenerate 612 a unique token key 614. The token key 614 is then used to decrypt 616 the received cryptogram 606, yielding the public portion 618 of the biometric template and the private portion 620 of the biometric template.

The public portion 618 of the biometric template is used in the processing 622 of the biometric sample 604. The results from the biometric processing 622 are verified 624 against the private portion 620 of the biometric template. If the stateless server verification process 626 is successful, the regenerated token key 614 is sent to the security token 632. If the stateless server verification process 626 is unsuccessful, a 'reject' signal 628 is sent to the security token 632.

Figure 7:
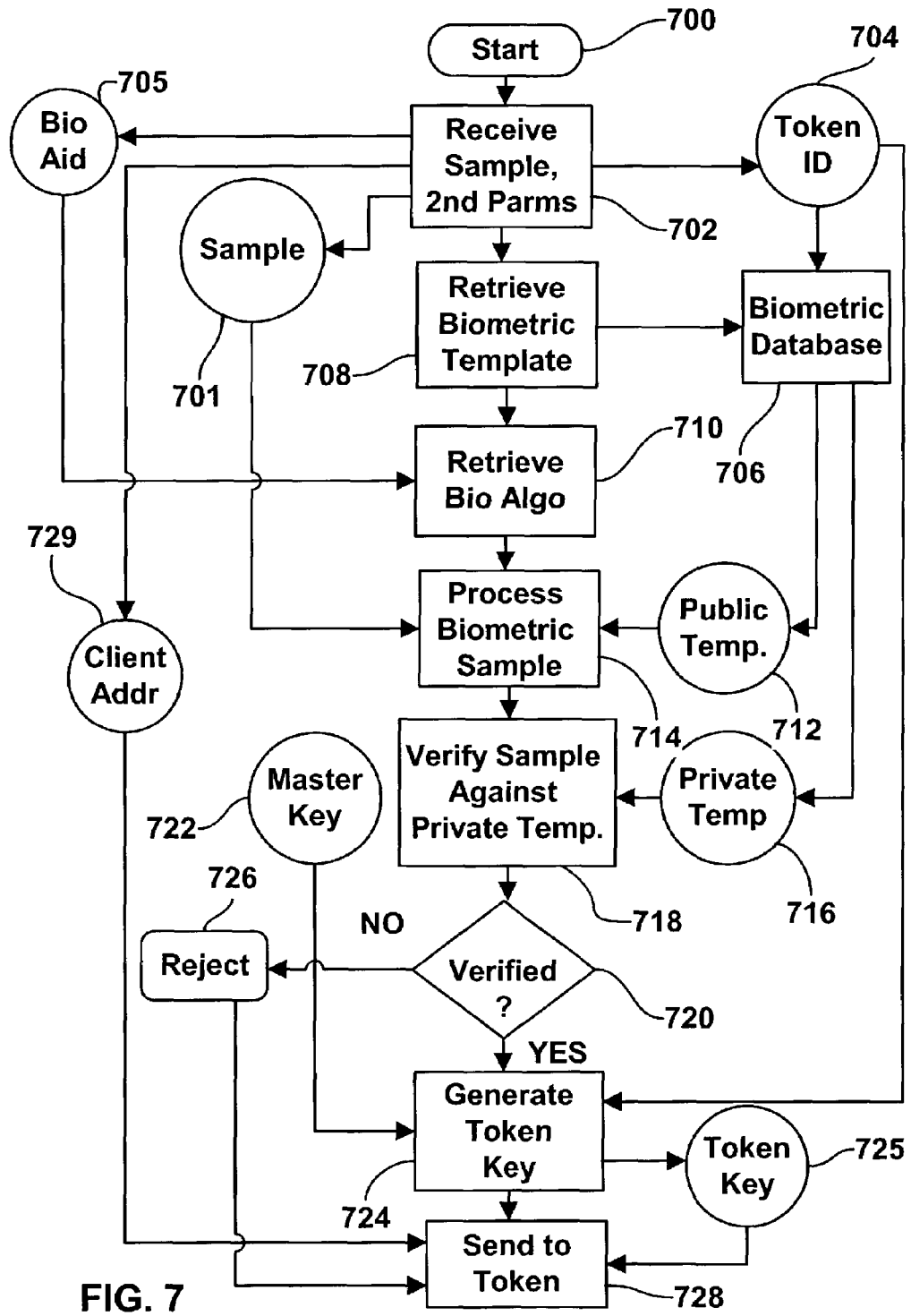
FIG. 7—is a flowchart illustrating the stateful server actions performed in the second embodiment of the invention.
Figure 7A:
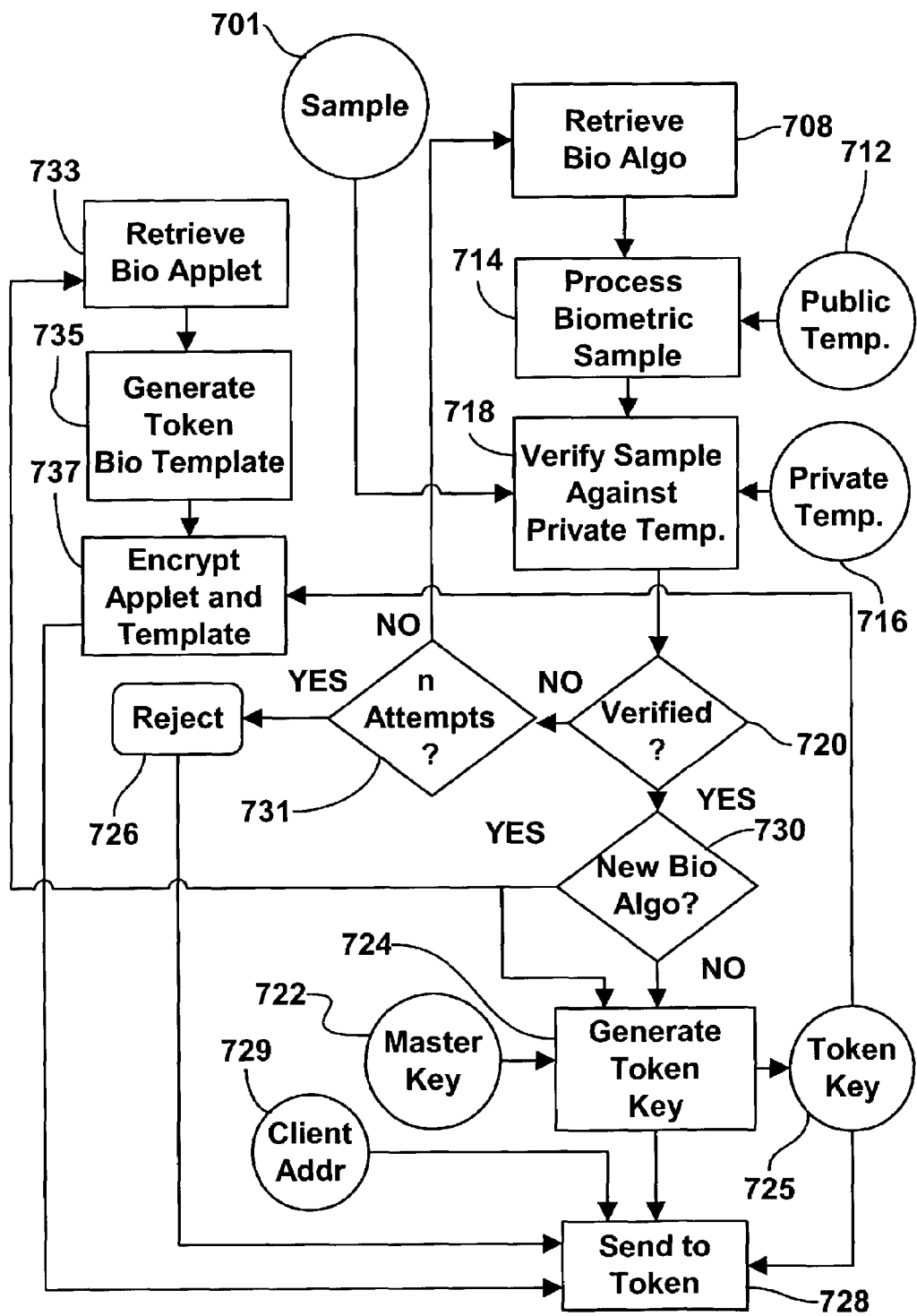
FIG. 7A—is a flowchart illustrating the stateful server actions performed in the second embodiment of the invention using an alternate biometric processing algorithm FIG. 7B—is a flowchart illustrating the stateful server actions performed in the second embodiment of the invention using a one-to-many biometric database query.
Figure 7B:
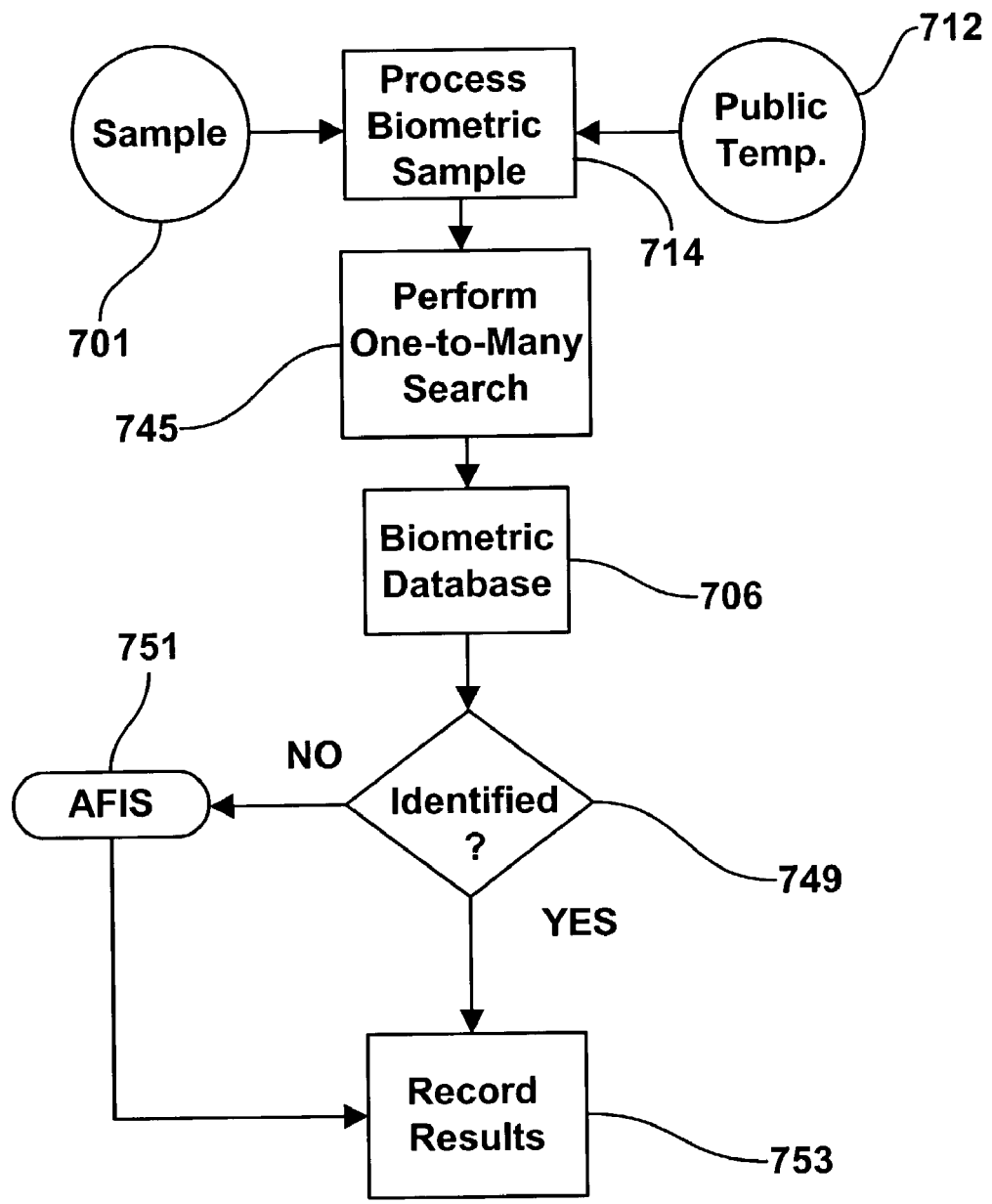

In a second embodiment of the invention (shown in dotted lines), the sample 604 and a second set of parameters including the client's telecommunications address 629, unique token identifier 608 and biometric algorithm descriptor 605 are sent to a stateful server 630 for further processing as described in the discussion for FIGS. 7, 7A and 7B.

FIG. 7 depicts a flowchart indicative of the steps to practice the second embodiment of the invention using the stateful server. The process is initiated 700 by receipt of the sample 701 and second set of parameters 702 sent from the stateless server. The second set of parameters includes the token identifier 704, the client address 729 and biometric algorithm descriptor 705. The token identifier is used to retrieve the public 712 and private 716 portions of the biometric template from a biometric database 706. The biometric algorithm descriptor 705 is used to retrieve the proper biometric processing algorithm from storage 710.

The public 712 portion of the biometric template is used in the processing 714 of the biometric sample 701. The results from the biometric processing 714 are verified 718 against the private portion 716 of the biometric template. If the stateful server verification process 720 is successful, a pre-existing master key 722 is diversified using the token identifier 704 to generate 724 a unique token key 725. The regenerated token key 725 is sent to the security token 728. If the stateful server verification process 720 is unsuccessful, a 'reject' signal 726 is sent to the security token 728 via the client address 729.

In FIG. 7A, a flowchart indicative of the steps to practice a second processing alternative is shown. The sample is initially processed using the steps described in FIG. 7. However, rather than sending the 'reject' signal 726, a counter 731 determines if the sample has been processed more than the number of biometric processing algorithms available.

If the counter 731 determines that the sample has not been processed by all available biometric algorithms, the next biometric processing algorithm is operatively installed 708 and the sample again processed as previously described. If the sample has been processed by all available biometric processing algorithms 731 and the verification process is still not successful 720, the 'reject' signal 726 is sent to the security token 728. If however, one of the new biometric processing algorithms 730 is successful in verifying the sample, a token key 725 is generated as previously described, an equivalent biometric processing applet is retrieved from storage 733 and a new biometric template is generated 735. The retrieved applet and newly generated template are then encrypted 737 using the token key 725 and a symmetric algorithm. The resulting cryptogram 737 is then sent to the client address 729 for installation inside the security token.

In FIG. 7B, a flowchart indicative of a final attempt to identify the source 701 of the biometric sample is shown. After the 'reject' signal 726 is sent to the security token shown in FIG. 7A, the sample 701 is processed 714 using the original public portion 712 of the biometric template and a one-to-many query 745 of the biometric database 706 is performed. If an approximate match is made, the identity 749 of the person is recorded 753 in an audit trail file. If the identity of the person is not found 749, a query is sent to an external database 751. The results of the external query are likewise recorded 753 in an audit trail file.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. Other variations and embodiments are possible in light of above teachings, and it is not intended that this Detailed Description limit the scope of invention, but rather by the Claims following herein.

What is claimed:

1. A system for providing access to a controlled resource, said system comprising:
   a hardware security token including a first cryptographic means and a first biometric verification means configured to allow access to a controlled resource, wherein the security token is configured to perform a first verification attempt of a biometric sample; and
   a stateless server configured to respond to said security token and including second biometric verification means and second cryptographic means compatible with said first cryptographic means, the second cryptographic means being coupled to said second biometric verification means;
   wherein the security token is configured to transfer the biometric sample and a biometric processing parameter to the stateless server for a second verification attempt, and wherein the stateless server generates a cryptographic secret using the biometric processing parameter and sends said cryptographic secret to said security token if said second verification attempt is successful.

2. The system according to claim 1 further comprising a stateful server, said stateful server responsive to said stateless server, wherein said stateful server includes a third biometric verification means and a third cryptographic means coupled to said third biometric verification means.

3. The system according to claim 2 wherein said second biometric verification means is configured to send said biometric sample to said stateful server for a third verification attempt.

4. The system according to claim 3 wherein said second biometric verification means is configured to send related biometric information to said stateful server for the third verification attempt, wherein said related biometric information includes a unique token identifier associated with said security token, a biometric template, and a biometric processing algorithm descriptor.

5. The system according to claim 4 wherein the stateless server includes a biometric database, said biometric database contains a plurality of high resolution biometric templates, each of said plurality of high resolution biometric templates being associated with the unique token identifier.

6. The system according to claim 5 wherein each of said plurality of high resolution biometric templates is indexed by said unique token identifier.

7. The system according to claim 6 wherein said third biometric verification means includes means for retrieving each of said plurality of high resolution biometric templates using said unique token identifier.

8. The system according to claim 2 wherein said second or third biometric verification means includes a plurality of replaceable biometric processing algorithms.

9. The system according to claim 8 wherein said plurality of replaceable biometric processing algorithms includes an associated unique biometric processing algorithm descriptor.

10. The system according to claim 2 wherein said security token and said stateless server are in communication over a telecommunications link.

11. The system according to claim 10 wherein said stateless server and said stateful server are in communication over said telecommunications link.

12. The system according to claim 11 wherein said telecommunications link includes a secure messaging protocol.

13. The system according to claim 2 wherein said first cryptographic means includes a token access key.

14. The system according to claim 13 wherein said second or third cryptographic means include a master key configured to communicate with said token access key.

15. The system according to claim 2 wherein said biometric processing parameter includes any of a unique identifier associated with said security token, a biometric template, or a biometric processing algorithm descriptor.

16. The system according to claim 15, wherein said second or third biometric verification means allows access to said controlled resource upon presentation of said cryptographic secret, wherein said unique identifier is used by said second or third cryptographic means to diversify said master key to generate said valid cryptographic secret.

17. The system according to claim 5 wherein each said high resolution biometric template includes unique physiological data associated with an authorized user of said security token.

18. The system according to claim 2 wherein said second biometric verification means includes first means for generating a reject result if said second verification attempt is unsuccessful, and wherein said third biometric verification means includes second means for generating said reject result if said third verification attempt is unsuccessful.

19. The system according to claim 18, wherein said second or third biometric verification means allows access to said controlled resource upon presentation of said cryptographic secret, wherein a result returned to the security token is either said reject or said cryptographic secret.

20. The system according to claim 19 wherein said reject includes means for locking said security token.

21. The system according to claim 2 wherein both said stateless and said stateful servers include greater processing capabilities than said security token.

22. The system according to claim 2 wherein said security token is operatively connectable to a client, said client including interface means for facilitating communications between said security token and said stateless server.

23. The system according to claim 22 wherein said client further includes biometric sample pre-processing means.

24. The system according to claim 2 wherein said stateful server further includes audit trail generating means.

25. The system according to claim 24 wherein said audit trail generating means includes means for recording transactions occurring on said stateless server, said stateful server or both.

26. The system of claim 1, wherein the security token comprises a smart card.

27. The system according to claim 1, wherein said biometric processing parameter includes any of a unique identifier associated with said security token, a biometric template, or a biometric processing algorithm descriptor.

28. The system of claim 22, wherein the client comprises a biometric scanner.

29. The system of claim 1, wherein the biometric sample is an initially unverifiable biometric sample.

30. A system for providing access to a controlled resource, said system comprising:
a physical security token comprising a first cryptographic module and a first biometric processing module, wherein the security token is configured to perform a first verification attempt of a biometric sample; and
a stateless server configured to respond to said security token, wherein the stateless server includes a second biometric processing module and a second cryptographic module compatible with said first cryptographic module and coupled to said second biometric processing module;
wherein the security token is configured to transfer the biometric sample and a biometric processing parameter to the stateless server for a second verification attempt, and wherein the stateless server generates a cryptographic secret using the biometric processing parameter and sends said cryptographic secret to said security token if said second verification attempt is successful.

31. The system of claim 30, wherein the security token further comprises a first comparator to compare a result from the first biometric processing module with a pre-established portion of a biometric template to generate a first verification signal.

32. The system of claim 31, wherein the security token further comprises an access gate module in communication with the first cryptographic module and the first comparator, wherein the access gate module allows access to the controlled resource based on any of said first verification signal or said cryptographic secret.

33. The system of claim 30, wherein the stateless server further comprises a second comparator to compare a result from the second biometric processing module with a biometric reference to generate a second verification signal.

34. The system of claim 33, wherein the second cryptographic module is in communication with the comparator, and wherein the second cryptographic module generates said cryptographic secret responsive to said second verification signal.

35. The system according to claim 30, further comprising a stateful server, said stateful server responsive to said stateless server, wherein said stateful server includes a third biometric processing module and a third cryptographic module coupled to said third biometric processing module.

36. The system according to claim 35, wherein said second biometric processing module is configured to send said biometric sample to said stateful server for a third verification attempt.

37. The system according to claim 36, wherein said second biometric processing module is configured to send related biometric information to said stateful server for the third verification attempt, wherein said related biometric information includes a unique token identifier associated with said security token, a biometric template, and a biometric processing algorithm descriptor.

38. The system according to claim 37, wherein the stateless server includes a biometric database, said biometric database contains a plurality of high resolution biometric templates, each of said plurality of high resolution biometric templates being associated with the unique token identifier.

39. The system according to claim 38, wherein each of said plurality of high resolution biometric templates is indexed by said unique token identifier.

40. The system according to claim 39, wherein said third biometric processing module retrieves each of said plurality of high resolution biometric templates using said unique token identifier.

41. The system according to claim 35, wherein said second biometric processing module or said third biometric processing module include a plurality of replaceable biometric processing algorithms.

42. The system according to claim 41, wherein said plurality of replaceable biometric processing algorithms includes an associated unique biometric processing algorithm descriptor.

43. The system according to claim 35, wherein said first cryptographic module includes a token access key.

44. The system according to claim 43, wherein said second cryptographic module or third cryptographic module include a master key configured to communicate with said token access key.

45. The system according to claim 30, wherein said biometric processing parameter includes any of a unique identifier associated with said security token, a biometric template, or a biometric processing algorithm descriptor.

46. The system according to claim 45, wherein said unique identifier is used by said second cryptographic module or third cryptographic module to diversify said master key to generate said cryptographic secret.

47. The system according to claim 46, wherein said biometric template includes unique physiological data associated with an authorized user of said security token.

48. The system according to claim 35, wherein said second biometric processing module generates a reject result if said second verification attempt is unsuccessful, and wherein said third biometric processing module generates said reject result if said third verification attempt is unsuccessful.

49. The system according to claim 48, wherein said reject includes means for locking said security token.

50. The system according to claim 35, wherein both said stateless and said stateful servers include greater processing capabilities than said security token.

51. The system according to claim 30, wherein said security token is operatively connectable to a client, said client including an interface to facilitate communications between said security token and said stateless server.

52. The system according to claim 51, wherein said client further includes a computer system that performs biometric sample pre-processing.

53. The system of claim 51, wherein the client comprises a biometric scanner.

54. The system according to claim 35, wherein said stateful server further comprises an audit module that records transactions occurring on said stateless server.

55. The system according to claim 54, wherein said audit module records transactions occurring on said stateful server.

56. The system of claim 30, wherein the security token comprises a smart card.

57. A server for providing access to a controlled resource, the server comprising:
 a biometric processing module configured to receive a biometric sample and a biometric processing parameter from a hardware security token for a second verification attempt when the security token has failed a first verification attempt of the biometric sample;
 a comparator in communication with the biometric processing module, wherein the comparator is configured to compare a result from the biometric processing module with a biometric reference to generate a verification signal; and
 a cryptographic module configured to generate a cryptographic secret using the biometric processing parameter and send said cryptographic secret to said security token if said second verification attempt is successful.

58. The server according to claim 57, further comprising a stateful server, said stateful server responsive to said biometric processing module, said biometric processing module is configured to send said biometric sample to said stateful server for a third verification attempt.

59. The server according to claim 58, wherein said biometric processing module is configured to send related biometric information to said stateful server for the third verification attempt, wherein said related biometric information includes a unique token identifier associated with said security token, a biometric template, and a biometric processing algorithm descriptor.

60. The server according to claim 59, wherein said biometric template includes unique physiological data associated with an authorized user of the security token.

61. The server according to claim 59, further comprising a biometric database, said biometric database contains a plurality of high resolution biometric templates, each of said plurality of high resolution biometric templates being associated with the unique token identifier.

62. The server according to claim 61, wherein each of said plurality of high resolution biometric templates is indexed by said unique token identifier.

63. The server according to claim 57, wherein said second biometric processing module includes a plurality of replaceable biometric processing algorithms.

64. The server according to claim 63, wherein said plurality of replaceable biometric processing algorithms includes an associated unique biometric processing algorithm descriptor.

65. The server according to claim 57, wherein said cryptographic module includes a master key configured to communicate with a token access key of the security token.

66. The server according to claim 57, wherein said biometric processing parameter includes any of a unique identifier associated with said security token, a biometric template, or a biometric processing algorithm descriptor.

67. The server according to claim 66, wherein said unique identifier is used by said cryptographic module to diversify said master key to generate said cryptographic secret.

68. The server according to claim 57, wherein said biometric processing module generates a reject result if said second verification attempt is unsuccessful.

69. The server according to claim 57, further comprising an audit module that records transactions.

* * * * *

UNITED STATES PATENT AND TRADEMARK OFFICE
CERTIFICATE OF CORRECTION

PATENT NO. : 7,574,734 B2  Page 1 of 1
APPLICATION NO. : 10/218640
DATED : August 11, 2009
INVENTOR(S) : Fedronic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this

Fourteenth Day of December, 2010

David J. Kappos
*Director of the United States Patent and Trademark Office*